(12) United States Patent
Pelfrey et al.

(10) Patent No.: US 7,055,864 B2
(45) Date of Patent: Jun. 6, 2006

(54) PNEUMATIC COUPLING

(75) Inventors: Rick D. Pelfrey, Indianapolis, IN (US); Christina G. Santiago, Indianapolis, IN (US); William O. Hodge, Greenfield, IN (US); Edward E. Kohl, Kirklin, IN (US); Michael D. Nowling, Clayton, IN (US)

(73) Assignee: SMC Corporation of America, Indianapolis, IN (US)

( * ) Notice: Subject to any disclaimer, the term of this patent is extended or adjusted under 35 U.S.C. 154(b) by 356 days.

(21) Appl. No.: 10/076,256

(22) Filed: Feb. 13, 2002

(65) Prior Publication Data

US 2002/0163187 A1 Nov. 7, 2002

Related U.S. Application Data

(60) Provisional application No. 60/268,308, filed on Feb. 13, 2001.

(51) Int. Cl.
*F16L 39/00* (2006.01)

(52) U.S. Cl. .................. 285/124.5; 285/79; 285/124.3; 285/124.4; 285/82; 285/311; 285/71; 29/890.14

(58) Field of Classification Search ................ 285/72, 285/79, 124.3, 124.4, 124.5, 124.1, 124.2, 285/83, 82, 311, 312, 71, 87, 26, 116; 29/282, 29/890.14
See application file for complete search history.

(56) References Cited

U.S. PATENT DOCUMENTS

| | | | |
|---|---|---|---|
| 412,609 A * | 10/1889 | Hammond et al. .......... 285/71 |
| 863,903 A * | 8/1907 | Chapple ..................... 285/312 |
| 943,330 A | 12/1909 | Yerke |
| 1,017,775 A | 2/1912 | Breton |
| 2,183,895 A * | 12/1939 | Reed ........................... 285/87 |
| 2,359,648 A | 10/1944 | Jones |
| 2,628,850 A | 2/1953 | Summerville |
| 3,140,105 A * | 7/1964 | Bielinski ..................... 285/71 |
| 3,469,863 A * | 9/1969 | Riester et al. ........... 285/124.4 |
| 3,523,700 A * | 8/1970 | Palmer ..................... 285/124.4 |
| 3,640,552 A * | 2/1972 | Demler et al. .............. 285/110 |
| 3,779,584 A * | 12/1973 | Ignatjev ................... 285/124.5 |
| 3,888,518 A * | 6/1975 | Delessert ..................... 285/39 |
| 3,917,318 A | 11/1975 | Legris |
| 4,015,720 A | 4/1977 | Peché |
| 4,183,599 A | 1/1980 | Wetzig |
| 4,213,573 A | 7/1980 | Schefer et al. |
| 4,402,534 A | 9/1983 | Keenan |
| 4,546,956 A | 10/1985 | Moberg |
| 4,586,694 A | 5/1986 | Jones |
| 4,753,268 A | 6/1988 | Palau |
| 4,754,993 A * | 7/1988 | Kraynick ................. 285/124.4 |
| 4,804,208 A * | 2/1989 | Dye ........................... 285/26 |
| 4,886,466 A | 12/1989 | Doherty et al. |
| 4,900,065 A * | 2/1990 | Houck ......................... 285/73 |
| 4,978,148 A * | 12/1990 | Kosugi et al. ........... 285/124.4 |

(Continued)

FOREIGN PATENT DOCUMENTS

DE 101 15 454 A1 8/2002

*Primary Examiner*—David Bochna
(74) *Attorney, Agent, or Firm*—Bose McKinney & Evans LLP

(57) ABSTRACT

A pneumatic coupling is provided. The pneumatic coupling is configured to couple a plurality of pneumatic lines together. According to the preferred embodiment of the present disclosure, the pneumatic coupling includes first and second housings and a plurality of fittings sized to receive the pneumatic lines.

36 Claims, 20 Drawing Sheets

U.S. PATENT DOCUMENTS

| | | | |
|---|---|---|---|
| 5,074,802 A | 12/1991 | Gratziani et al. | |
| 5,123,446 A | 6/1992 | Haunhorst et al. | |
| 5,215,122 A | 6/1993 | Rogers et al. | |
| 5,323,808 A * | 6/1994 | Shimizu | 137/594 |
| 5,333,647 A | 8/1994 | Fukano et al. | |
| 5,344,194 A * | 9/1994 | Hatagishi et al. | 285/26 |
| 5,388,864 A | 2/1995 | Kozinski | |
| 5,464,042 A | 11/1995 | Haunhorst | |
| 5,507,530 A * | 4/1996 | Mahaney | 285/26 |
| 5,547,166 A | 8/1996 | Engdahl | |
| 5,655,794 A | 8/1997 | Sell | |
| 5,779,277 A | 7/1998 | Street | |
| 5,839,764 A | 11/1998 | Heidelberger | |
| 5,848,814 A * | 12/1998 | Nadasky et al. | 285/342 |
| 5,868,474 A * | 2/1999 | Abe et al. | 303/140 |
| 5,984,371 A * | 11/1999 | Mailleux | 285/26 |
| 6,062,244 A | 5/2000 | Arkans | |
| 6,189,714 B1 | 2/2001 | Kettle, Jr. et al. | |
| 6,226,068 B1 | 5/2001 | Arcykiewicz et al. | |
| 6,253,786 B1 | 7/2001 | Maa | |
| 6,254,144 B1 | 7/2001 | Hagan | |
| 6,267,612 B1 | 7/2001 | Arcykiewicz et al. | |
| 6,302,451 B1 | 10/2001 | Olson | |
| 6,443,498 B1 * | 9/2002 | Liao | 285/124.1 |
| 2003/0178275 A1 | 9/2003 | Breier et al. | 192/3.29 |
| 2004/0060793 A1 | 4/2004 | Dacho et al. | 192/3.29 |

* cited by examiner

PNEUMATIC COUPLING

This application claims benefit of U.S. Provisional Application Ser. No. 60/268,308, filed Feb. 13, 2001, titled Pneumatic Coupling, the disclosure of which is expressly incorporated by reference herein.

BACKGROUND OF THE INVENTION

The present invention relates to pneumatic couplings. More specifically, the present inventions relates to pneumatic couplings used on vehicles.

According to a first aspect of the present invention, a pneumatic device is provided that is configured to supply pressurized air. The pneumatic device includes a plurality of pneumatic supply lines, a plurality of pneumatic receiving lines configured to receive pressurized air from the plurality of pneumatic supply lines, a pneumatic coupling configured to couple and uncouple the plurality of pneumatic receiving lines from the plurality of pneumatic supply lines. The pneumatic coupling includes a two-piece housing, a plurality of supply line fittings configured to receive the plurality of pneumatic supply lines, a plurality of receiving line fittings configured to receive the plurality of pneumatic receiving lines, and an over-center latch configured to couple the two-piece housing together. The two-piece housing includes a pair of identical housings. Each identical housing includes a plurality of channel bodies defining channels sized to receive the plurality of supply and receiving line fittings and a plurality of parallel ribs coupled to the channel bodies. Each of the ribs has a cantilevered portion extending away from at least one of the channel bodies. The channels have an exterior end and an interior end. The plurality of supply and receiving pneumatic lines are positioned within the exterior ends of the channels. The interior ends of the channels of one of the identical housings is positioned adjacent to the interior ends of the channels of the other identical housing. Each of the plurality of supply and receiving line fittings are sized for insertion through the interior ends of the channels to couple with at least one of the supply and pneumatic receiving lines. The over-center latch is configured to couple the cantilevered portions of the ribs of one of the identical housings to the cantilevered portions of the ribs of the other identical housing to separably couple the two-piece housing together.

According to another aspect of the invention, a pneumatic coupling is provided that is configured to couple a plurality of pneumatic lines. The pneumatic coupling includes a first housing having at least one aperture sized to receive a first pneumatic line of the plurality of the pneumatic lines, a second housing having at least one aperture sized to receive a second pneumatic line of the plurality of pneumatic lines, and a coupler configured to couple the second housing to the first housing to couple the first and second pneumatic lines in fluid communication. The coupler includes a link pivotably coupled to the first housing and a latch member pivotably coupled to the link and configured to couple the second housing to the first housing.

According to another aspect of the present invention, a pneumatic coupling is provided that is configured to couple a plurality of pneumatic lines. The pneumatic coupling includes a first housing adapted to receive a first pneumatic line of the plurality of pneumatic lines and a second housing adapted to receive a second pneumatic line of the plurality of pneumatic lines. The second housing is movable relative to the first housing between a first position coupled to the first housing and second position coupled to the first housing. When the second housing is in the first position, the first and second pneumatic lines are in sealed fluid communication permitting air to flow therebetween. When the second housing is in the second position, the first and second pneumatic lines are unsealed permitting air from the first pneumatic line to flow externally of the first and second pneumatic lines.

According to another aspect of the present invention, a pneumatic device is provided. The pneumatic device includes a first pneumatic component configured to receive pressurized air, a second pneumatic component configured to receive pressurized air, and a pneumatic coupling configured to couple the first pneumatic component to the second pneumatic. The pneumatic coupling is configured to move from a first position with the first and second components fluidly coupled to permit the flow of pressurized air from the first pneumatic component to the second pneumatic component and a second position with the first and second pneumatic components fluidly uncoupled to permit the flow of pressurized air from the first pneumatic component to a location external of the first and second pneumatic components. The second pneumatic component is restrained from moving beyond a predetermined distance from the first pneumatic component when the pneumatic coupling is in the second position.

According to another aspect of the present invention, a pneumatic device is provided. The pneumatic device includes a first pneumatic component configured to receive pressurized air, a second pneumatic component configured to receive pressured air, and a two-stage pneumatic coupling configured to move between a first coupled position, a second coupled position, and a third uncoupled position. The first and second pneumatic components are coupled together and in sealed fluid communication when the two-stage pneumatic coupling is in the first coupled position. The first and second pneumatic components are coupled together and unsealed when the two-stage pneumatic coupling is in the second coupled position. The first and second pneumatic components are uncoupled when the two-stage pneumatic coupling is in the uncoupled position.

According to another aspect of the present invention, a pneumatic coupling is provided that is configured to couple a plurality of pneumatic lines. The pneumatic coupling includes a housing adapted to receive the plurality of pneumatic lines and a plurality of fittings sized to receive the plurality of pneumatic lines. The housing includes an interior region and a plurality of exterior edges defining a plurality of apertures sized to receive the plurality of pneumatic lines. The plurality of edges define a minimum width across the plurality of apertures. At least a portion of the plurality of fittings is positioned in the interior region of the housing in a position aligned with a corresponding one of the plurality of apertures. The portions of the plurality of fittings have a maximum width that is greater than the minimum width of the corresponding aperture of the housing.

According to another aspect of the present invention, a pneumatic coupling is provided that is configured to couple a plurality of pneumatic lines. The pneumatic coupling includes an exterior housing adapted to receive the plurality of pneumatic lines, a plurality of fittings adapted to receive the plurality of pneumatic lines, and an interior housing. The exterior housing includes an interior region and a plurality of apertures sized to receive the plurality of pneumatic lines. The plurality of fittings are positioned in the interior region of the external housing. The interior housing is positioned in the interior region of the external housing and is configured to align the plurality of fittings with the plurality of apertures in the exterior housing to receive the plurality of pneumatic lines.

According to another aspect of the present invention, a pneumatic coupling is provided that is configured to couple a plurality of pneumatic components. The pneumatic coupling includes a housing configured to receive a plurality of pneumatic components and fluidly couple first and second pneumatic components of the plurality of pneumatic components together. The housing includes a plurality of parallel ribs defining a plurality of grooves therebetween.

According to another aspect of the present invention, a pneumatic device is provided. The pneumatic device includes a first pneumatic coupling configured to couple a plurality of pneumatic supply lines to a plurality of pneumatic receiving lines and a second pneumatic coupling configured to couple a plurality of pneumatic supply lines to a plurality of pneumatic receiving lines. The first and second pneumatic couplings are configured to couple together.

According to another aspect of the present invention, a method of coupling and uncoupling first and second pneumatic components using a pneumatic coupling is provided. The method includes the steps of coupling the first pneumatic component to the second pneumatic component using the pneumatic coupling so that the first and second pneumatic components are in sealed fluid communication; unsealing the first pneumatic component from the second pneumatic component by permitting movement of the second pneumatic component relative to the first pneumatic component; restraining movement of the second pneumatic component beyond a predetermined location relative to the first pneumatic component with the pneumatic coupling after the unsealing step; and uncoupling the first pneumatic component from the second pneumatic component so that the movement of the second pneumatic component is no longer restrained by the pneumatic coupling.

According to another aspect of the present invention, a method of assembling a pneumatic device is provided. The method includes the step of providing a pneumatic coupling including a housing and a fitting. The housing defines an interior region and an exterior aperture. The method further includes the step of inserting the fitting into the interior region of the housing to a position aligned with the exterior aperture.

Additional features of the present invention will become apparent to those skilled in the art upon consideration of the following detailed description of the preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
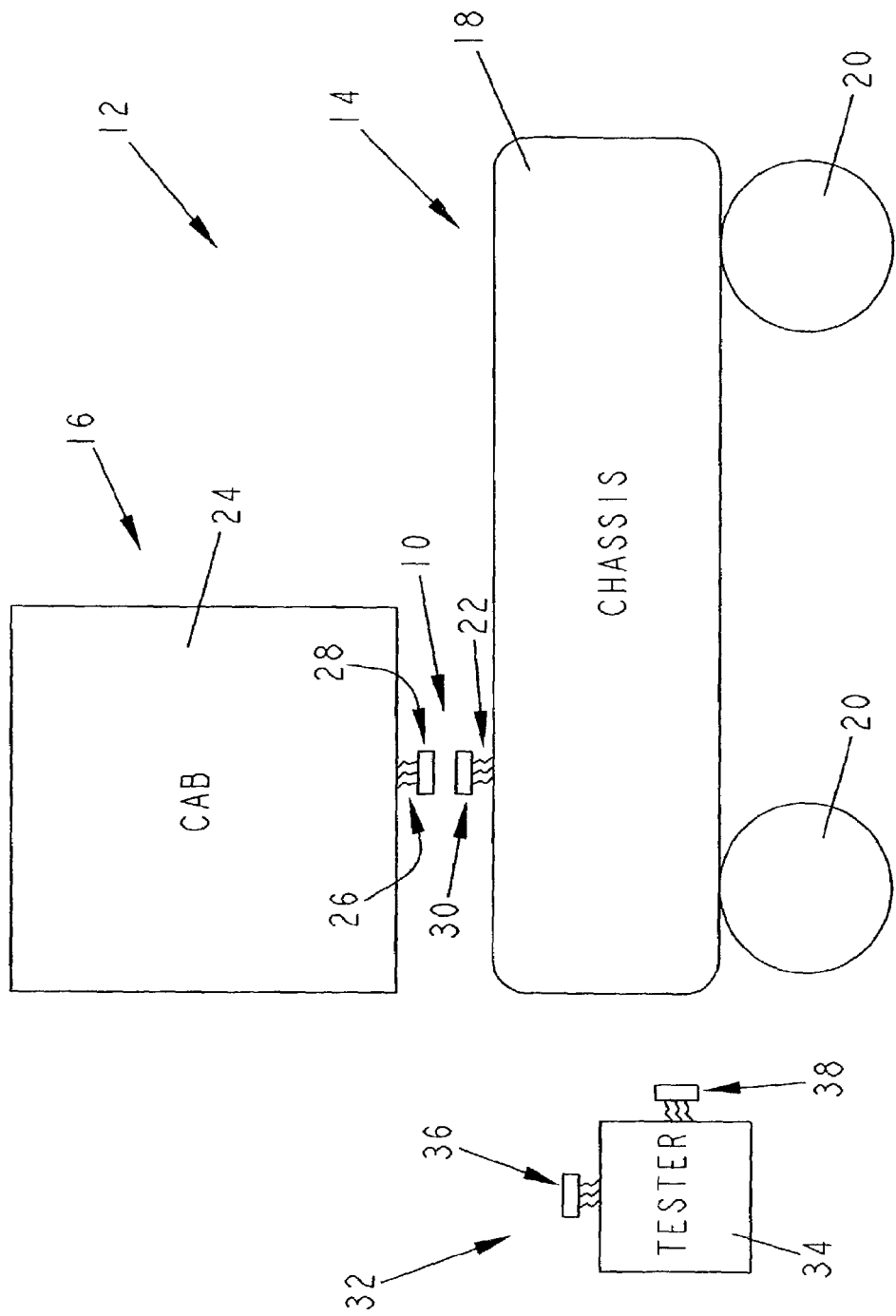
FIG. 1 is a diagrammatic view of a vehicle during assembly showing the vehicle including a chassis and a cab before the cab is assembled to the chassis and the chassis and the cab including pneumatic housings configured to provide communication of air between the cab and chassis.

According to the present disclosure, a pneumatic coupling 10 is provided for use with a heavy vehicle 12 such as a semi-truck bus, delivery truck, or other vehicles that are equipped with a pneumatic system (not shown). As shown in FIG. 1, vehicle 12 includes a chassis 14 and a cab 16 positioned for assembly to chassis 14. Chassis 14 includes a frame 18, a plurality of wheels 20 supporting frame 18, and a plurality of pneumatic lines 22 supported by frame 18 and configured to provide air to control and power various functions of chassis 14 such as air brakes (not shown), ride-control systems (not shown), and other pneumatic systems of vehicle 12. Cab 16 includes a frame 24 and a plurality of pneumatic lines 26 supported by frame 24 and configured to provide air to control and power the various pneumatic systems of vehicle 12.

Figure 2:
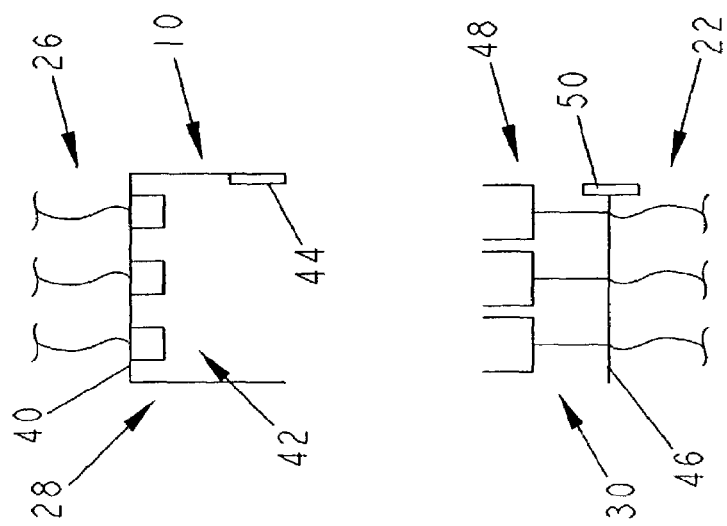
FIG. 2 is a diagrammatic view of the pneumatic housings of FIG. 1 showing the uppermost pneumatic housing including a base and a plurality of male bosses or couplings coupled to the base and the lowermost pneumatic housing including a base and a plurality of female bosses or couplings coupled to the base and configured to receive the male couplings.

Pneumatic coupling 10 is configured to couple pneumatic lines 26 of cab 16 to pneumatic lines 22 of chassis 14. As shown in FIG. 2, pneumatic coupling 10 includes a first housing 28 coupled to pneumatic lines 26 of cab 16 and a second housing 30 coupled to pneumatic lines 22 of chassis 14. First and second housings 28, 30 are configured to couple together and provide communication of air between pneumatic lines 26 of cab 16 and pneumatic lines 28 of chassis 14 to facilitate delivery of air between the pneumatic components (not shown) in cab 16 and the pneumatic components (not shown) on chassis 14.

Before vehicles 12 are delivered to a customer or truck dealer, all the pneumatic systems are tested. It is preferable to perform such testing before the vehicle is removed from the assembly line. To facilitate such testing, a pneumatic tester 32 is provided that is configured to test the operation of the pneumatic systems of vehicle 12. Tester 32 includes a base 34, a first housing 36 configured to couple to second housing 30, and a second housing 38 configured to couple to first housing 28. According to an alternative embodiment of the present disclosure, a tester for the cab and a separate tester for the chassis are provided to permit testing of the cab and chassis on separate assembly lines before the cab and chassis are assembled together.

To perform a test of the pneumatic systems of vehicle 12, first housing 36 of tester 32 is coupled to second housing 30 of pneumatic coupling 10 and second housing 38 of tester 32 is couple to first housing 28 of pneumatic coupling 10. Then tester 32 tests the operation of the pneumatic systems of vehicle 12 by sending and receiving air through pneumatic lines 22 of chassis 14 and pneumatic lines 26 of cab 16 to simulates the pneumatic systems'operating conditions.

If a component of the pneumatic system of vehicle 12 is not performing properly, the component is replaced or repaired while cab 16 and chassis 14 are still on the assembly line. If the components of the pneumatic system of the vehicle all perform properly, first and second housings 36, 38 of tester 32 are removed from second and first housings 30, 28 of pneumatic coupling 10 and first and second housings 28, 30 of pneumatic coupling 10 are coupled together to provide communication of air between cab 16 and chassis 14. According to alternative embodiments of the present disclosure, pneumatic couplings are provided between other pneumatic lines of vehicle 12 to provide communication of air between said pneumatic lines.

As previously mentioned, first housing 28 is configured to couple to second housing 30 to provide communication of air between pneumatic lines 26 of cab 16 and pneumatic lines 22 of chassis 14. As shown in FIG. 2, first housing 28 includes a base 40, a plurality of male bosses or couplings or fittings 42 coupled to base 40 and in communication with pneumatic lines 26 of cab 16, and a fastener or coupler 44 coupled to base 40. Second housing 30 includes a base 46, a plurality of female bosses or couplings or fittings 48 coupled to base 46, and a fastener or coupler 50 coupled to base 46. When first housing 28 is coupled to second housing 30, as shown in FIG. 3, female couplings 48 receive male couplings 42 to provide communication of air between pneumatic lines 22 of chassis 14 and pneumatic lines 26 of cab 16.

Figure 4:
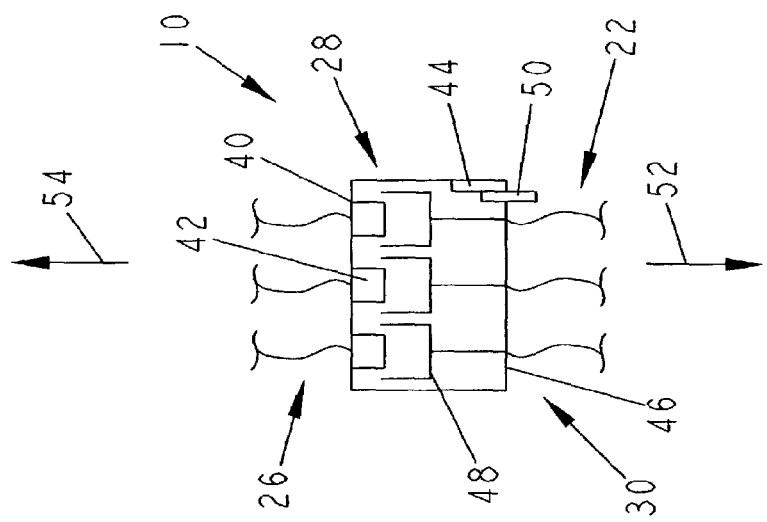
FIG. 4 is a view similar to FIG. 2 showing the male couplings separated from the female couplings with the bases of the uppermost and lowermost pneumatic housing coupled together by the pair of couplers.
Figure 3:
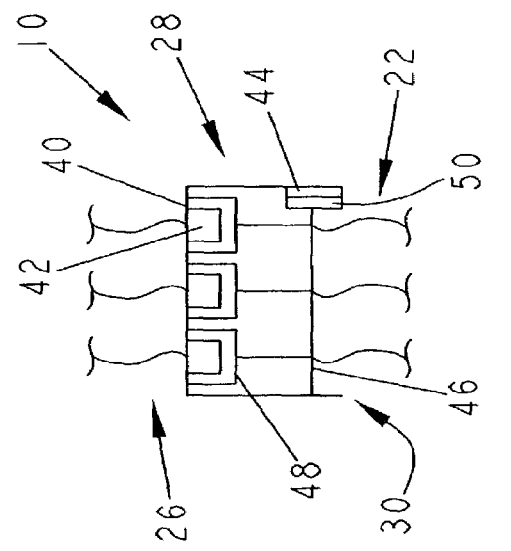
FIG. 3 is a view similar to FIG. 2 showing the male couplings coupled to the female couplings to provide communication between pneumatic lines coupled to the bases of the uppermost and lowermost housings and the bases of the uppermost and lowermost pneumatic housings coupled together by a pair of couplers (shown on the right side of the bases)

Fastener 44 of first housing 28 cooperates with fastener 50 of second housing 30 to secure bases 40, 46 and couplings 42, 48 together to maintain the communication of air between pneumatic lines 22 of chassis 14 and pneumatic lines 26 of cab 16 as shown in FIG. 3. Couplers 44, 50 also cooperate to permit separation of couplings 42, 48, but continue to secure bases 40, 46 together as shown in FIG. 4.

When couplings 42, 48 are separated, air is no longer communicated between pneumatic lines 22 of chassis 14 and pneumatic lines 26 of cab 16. Furthermore, during separation of couplings 42, 48, pressurized air within pneumatic lines 22, 26 has a tendency to push housings 28, 30 apart in directions 52, 54. Couplers 44, 50 are configured to block complete separation of housings 28, 30 when couplings 42, 48 are separating.

Couplers 44, 50 are also configured to permit complete separation of housings 28, 30. After couplings 42, 38 are separated and the initial surge of pressurized air in lines 22, 26 has dissipated, the assembler, maintenance technician, or other person can release couplers 44, 50 and fully remove second housing 30 from first housing 28 as shown in FIG. 2.

Figure 5:
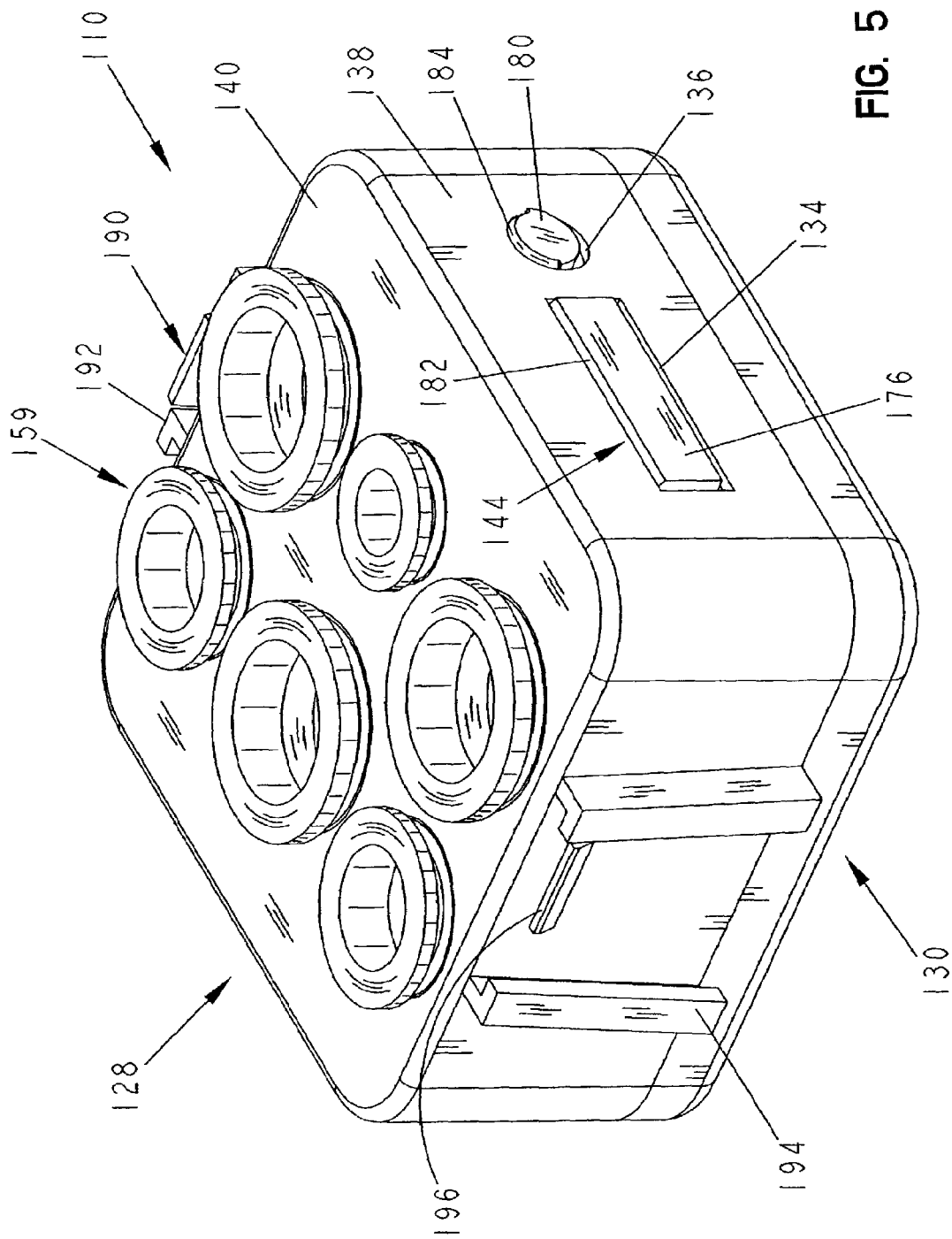
FIG. 5 is a perspective view of a first embodiment pneumatic coupling according to the present disclosure showing the coupling including a first housing having six ports coupled thereto and a second housing coupled to the first housing.
Figure 6:
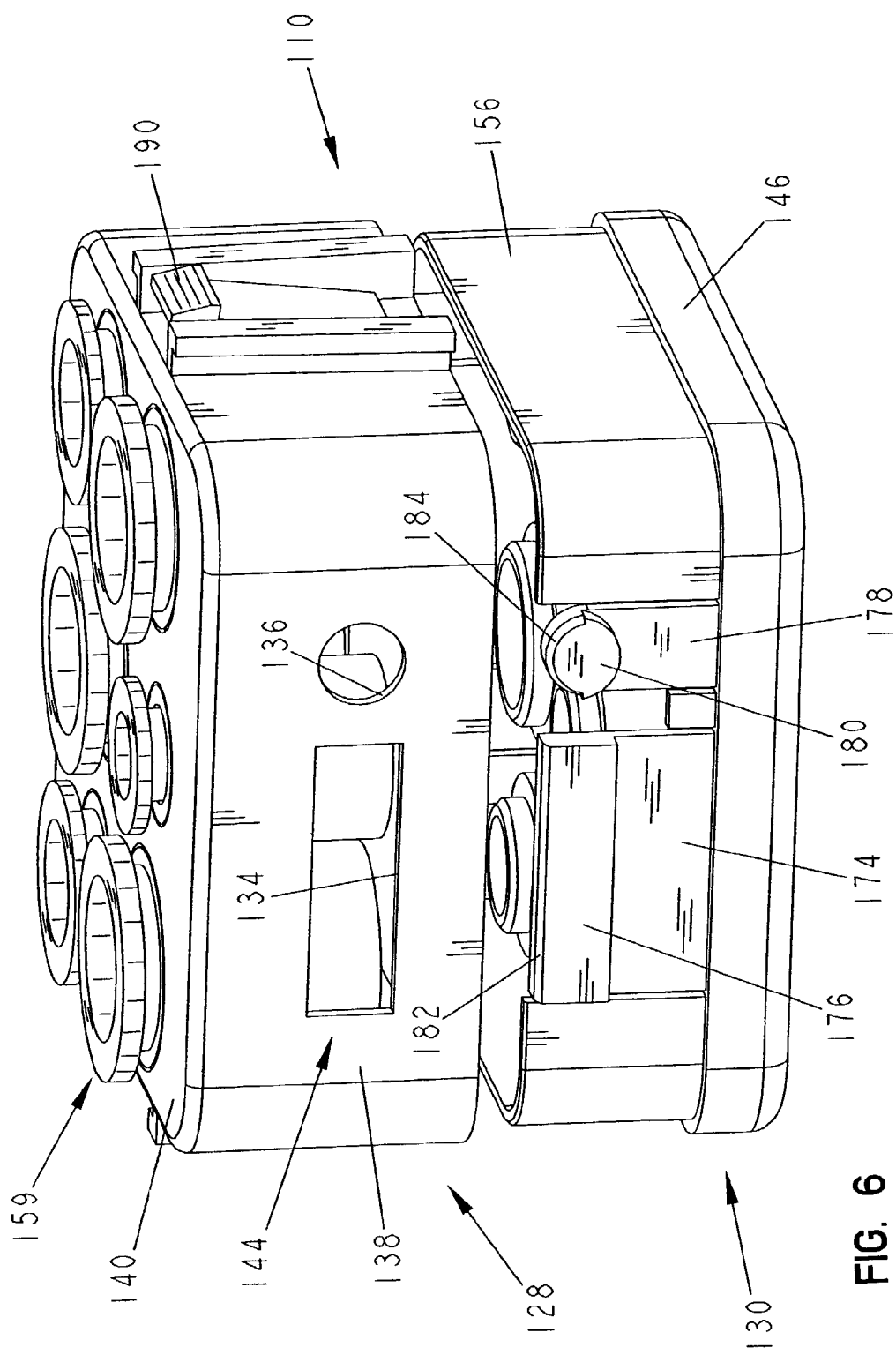
FIG. 6 is a perspective view of the pneumatic coupling of FIG. 5 showing the second housing spaced apart from the first housing.

A first preferred embodiment pneumatic coupling 110 is shown in FIGS. 5–10. As shown in FIG. 6, pneumatic coupling 110 includes a first housing 128 configured to couple to a set of six pneumatic lines (not shown), such as pneumatic lines 26 of cab 16, and a second housing 130 configured to couple to another set of six pneumatic lines (not shown), such as pneumatic lines 22 of chassis 14.

According to the first embodiment of the present disclosure, the first and second housings 128, 130 have a substantially square shape and the overall dimension of pneumatic coupling is 3 inches (7.62 centimeters)×3 inches (7.62 centimeters)×2 inches (5.08 centimeters). According to alternative embodiments of the present disclosure, other shapes and size of housings are provided for the pneumatic couplings disclosed herein. For example, according to other alternative embodiment of the present disclosure, the housings are circular, oval, hexagonal, square, triangular or other shapes known to those of ordinary skill in the art.

According to alternative embodiments of the present disclosure, the pneumatic couplings disclosed herein are configured to couple fewer or more than six pneumatic lines or other pneumatic components. For example, according to one embodiment of the present disclosure, the housings are configured to couple a single pneumatic line or other pneumatic component to another single pneumatic line or other pneumatic component. According to another embodiment of the present disclosure, the housings are configured to couple a hundred pneumatic lines together.

First and second housings 128, 130 are configured to couple together and provide communication of air between the two sets of pneumatic lines to facilitate delivery of air between the pneumatic components. First housing 128 is configured to couple to a housing (not shown) of a pneumatic system tester, such as tester 36, and second housing 130 is configured to couple to another housing of the tester to perform test on the pneumatic systems of a vehicle as described above.

Figure 9:
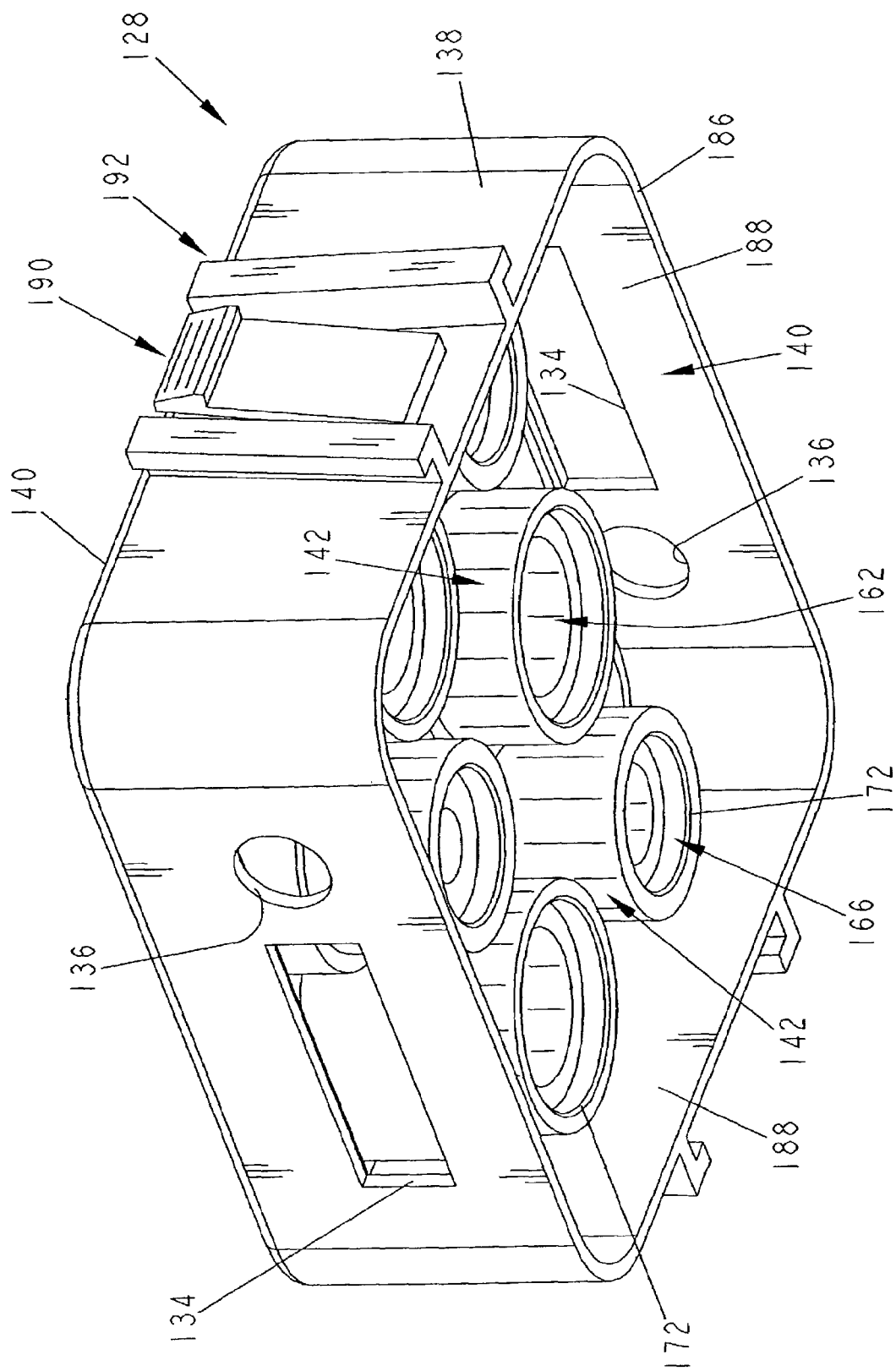
FIG. 9 is a perspective view of the first housing showing the first housing including a base, a substantially square perimeter wall sized to receive the perimeter wall of the second housing therein, six female bosses or couplings sized to receive the male couplings of the second housing therein, two set of tab-receiving apertures defined in the perimeter wall and sized to receive the rectangular and circular tabs of the second housing therein, and a mounting tab and pair of tracks coupled to an outer surface of the perimeter wall.

As shown in FIG. 9, first housing 128 includes a base 140, a plurality of female bosses or internal couplings 142 coupled to base 140, a perimeter wall 138 coupled to base 140, and a fastener or coupler 144 including first and second tab-receiving apertures 134, 136 formed in perimeter wall 138. Second housing 130 includes a base 146, a perimeter wall 156 sized to fit within perimeter wall 138 of first housing 128, a plurality of male bosses or couplings 148 coupled to base 146, and a pair of couplers 150 including first and second flexible tabs 158, 160 coupled to base 146. According to alternative embodiments of the present disclosure, other couplers such as screws, snaps, cam locks, detents, bolts, rivets, latches, adhesives, and other couplers known to those of ordinary skill in the art are provided for the couplers of the various pneumatic couplings disclosed herein.

Figure 10:
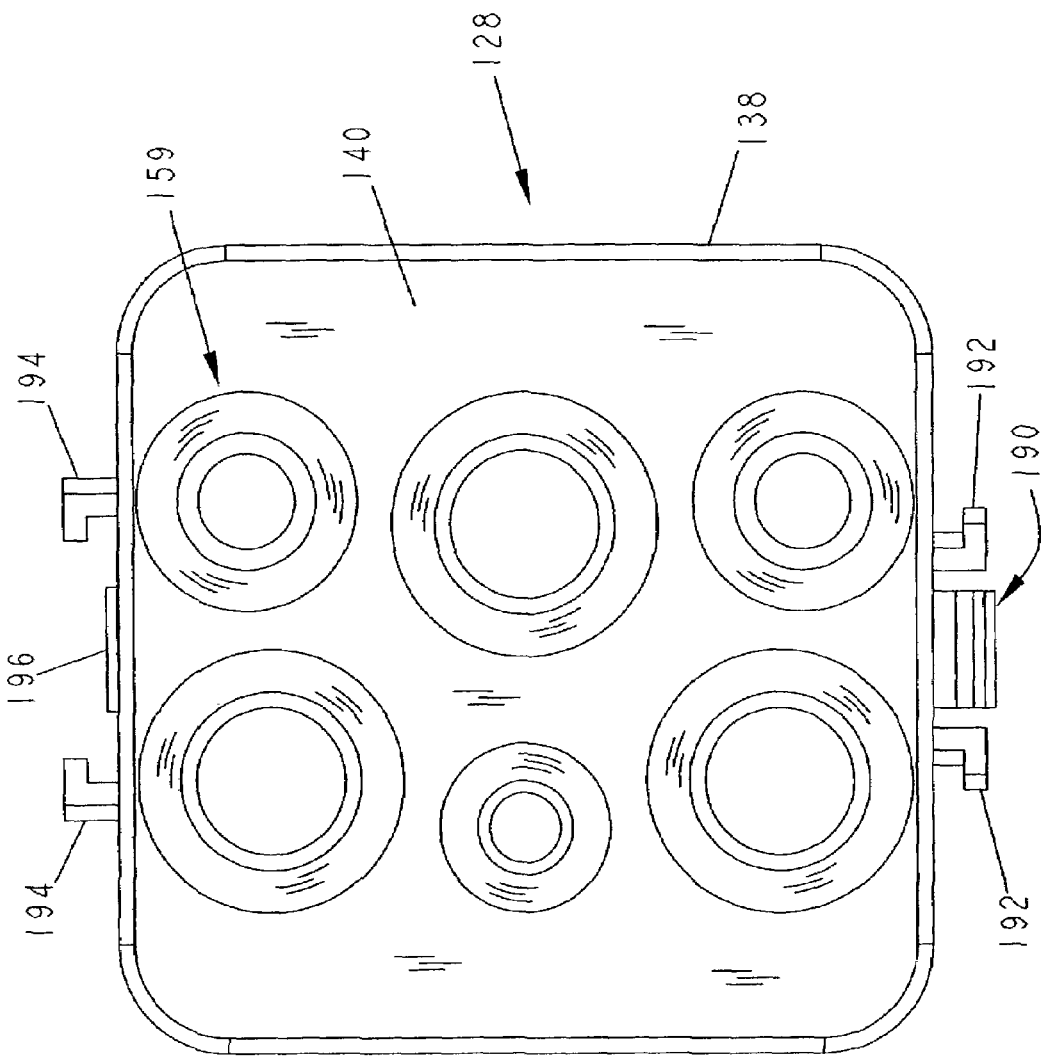
FIG. 10 is a top plan view of the six ports in communication with the six female couplings and a pair of track-receiving grooves coupled to the outer surface of the perimeter wall opposite the pair of tracks.

First and second housings 128, 130 further include a plurality of ports or cartridges or fittings 159 positioned in respective apertures 162, 164 that extend through respective bases 140, 146, as shown in FIGS. 5 and 10 for first housing 128 (ports 159 of second housing 130 are substantially identical to ports 159 of first housing 128). Pneumatic lines are plugged into ports 159 to provide communication of air between the pneumatic lines and respective female and male couplings 142, 148 of first and second housings 128, 130.

Additional description of suitable ports/cartridges/fittings for the pneumatic couplings disclosed herein is provided in U.S. Pat. Nos. 5,333,647; 5,459,953; 5,725,255; 6,062,260; and 6,131,610, the disclosures of which are expressly incorporated by reference herein as well as those ports/cartridges/fittings disclosed herein. According to the preferred embodiment of the present disclosure, an pneumatic line is coupled to port 159 by insert an end of the pneumatic line into port 159. To remove the pneumatic line, the pneumatic line must first be pushed in the direction of port 159 and then pulled in an opposite direction. According to alternative embodiments of the present disclosure, ports that permanently receive the pneumatic line and other port configurations known to those of ordinary skill in the art are provided.

When first housing 128 is coupled to second housing 130, as shown in FIG. 5, female couplings 142 receive male couplings 148 to provide communication of air between pneumatic lines coupled. O-rings (not shown) are provided between female and male couplings 142, 148 to provide a seal therebetween.

As shown in FIG. 9, each female coupling 142 includes a shoulder-receiving aperture 166. Each male coupling 148 includes a shoulder 168 sized to fit within a respective shoulder-receiving aperture 166 of female coupling 142. Each shoulder 168 of male coupling 148 includes a chamfered edge 170 and each female coupling 142 includes a corresponding chamfered edge 172 that assists in guiding shoulders 168 into shoulder-receiving apertures 166.

Figure 7:
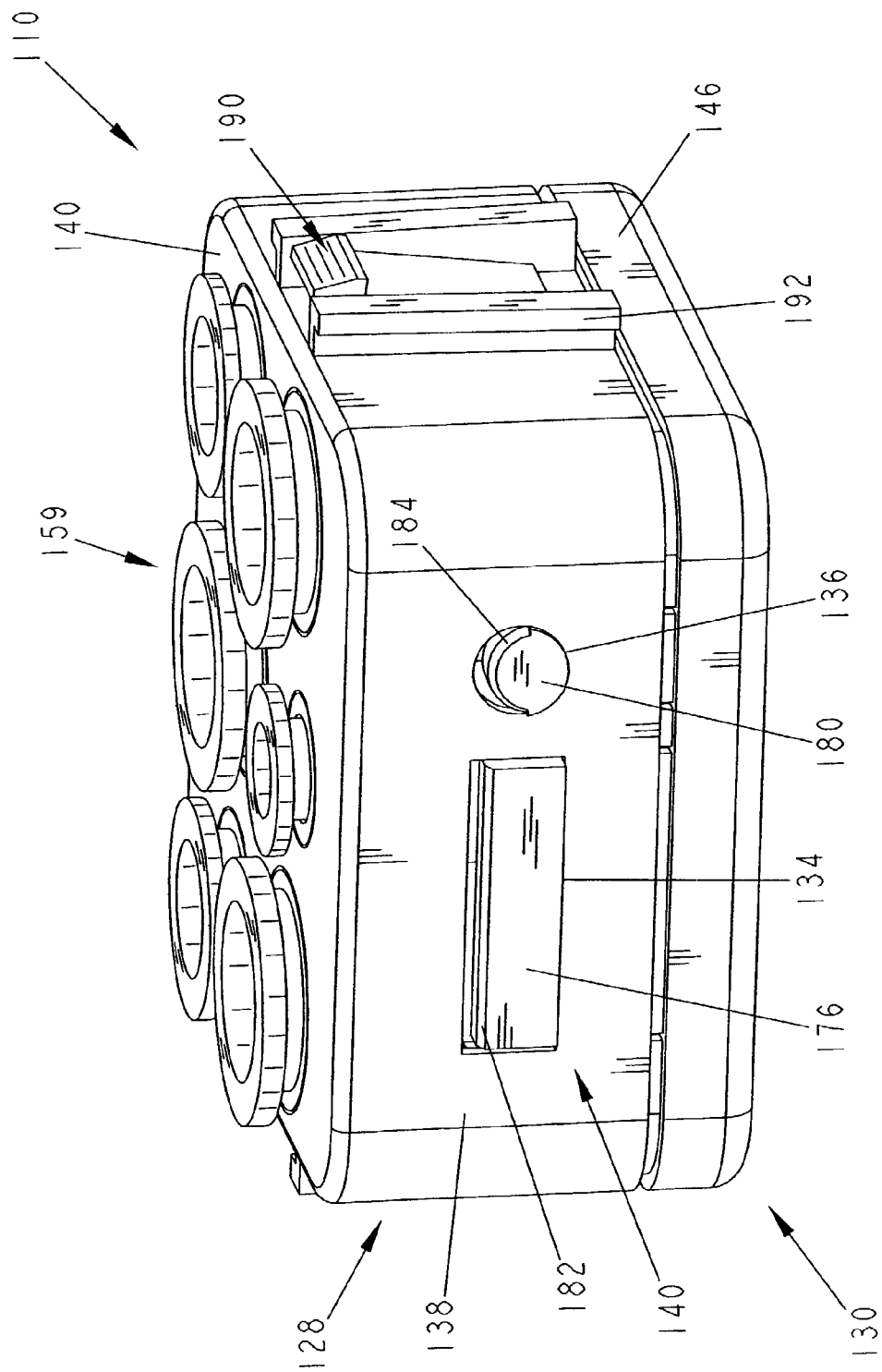
FIG. 7 is a perspective view of the pneumatic coupling of FIG. 5 showing the second housing pulled slightly apart from the first housing.

Couplers 144 of first housing 128 cooperate with couplers 150 of second housing 130 to secure bases 140, 146 and couplings 142, 148 together to maintain the communication of air between the pneumatic lines coupled to ports 159. Couplers 144, 150 also cooperate to permit separation of couplings 142, 148, but continue to secure bases 140, 146 together as shown in FIG. 7.

When couplings 142, 148 are separated, air is no longer communicated between the pneumatic lines. Furthermore, during separation of couplings 142, 148, pressurized air within the pneumatic lines has a tendency to push housings 128, 130 apart in directions 152, 154. Couplers 144, 150 are configured to block complete separation of housings 128, 130 when couplings 142, 148 are separating.

Couplers 144, 150 are also configured to permit complete separation of housings 128, 130 as shown in FIG. 6. After couplings 142, 148 are separated and the initial surge of pressurized air in the pneumatic lines has dissipated, the assembler, maintenance technician, or other person can release couplers 144, 150 and fully remove second housing 130 from first housing 128 as shown in FIG. 6.

Figure 8:
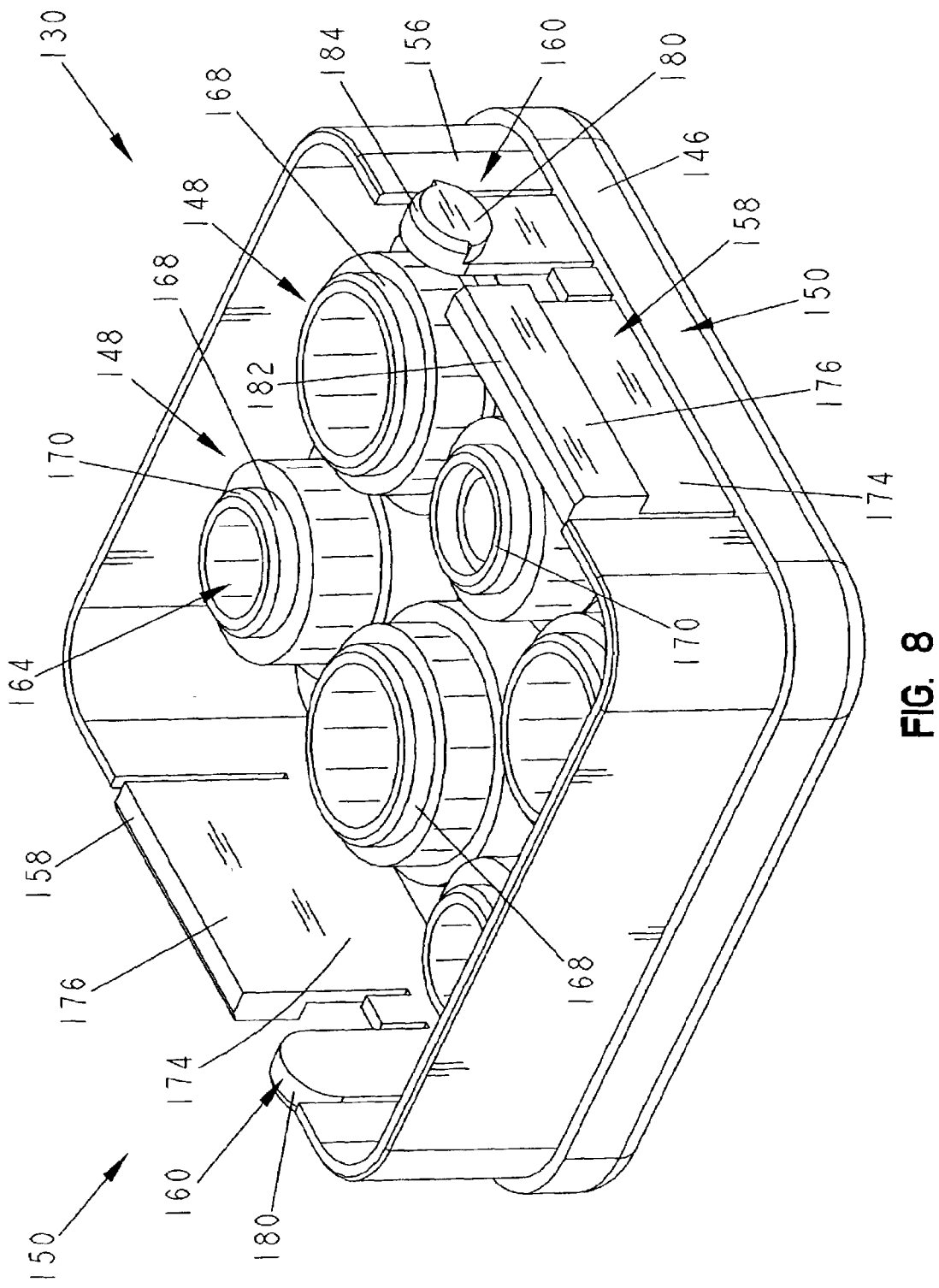
FIG. 8 is a perspective view of the second housing showing the second housing including a base, a substantially square perimeter wall, six male bosses or couplings coupled to the base, and two sets of flexible tabs including a rectangular tab and a circular tab.

As previously mentioned, couplers 150 include first and second flexible tabs 158, 160 coupled to base 146 as shown in FIG. 8. First flexible tab 158 includes a flexible finger 174 having a proximal end coupled to base 146 and a rectangular detent 176 coupled to a distal end of finger 174. Similarly, second flexible tab 160 includes a flexible finger 178 having a proximal end coupled to base 146 and a circular detent 180 coupled to a distal end of flexible finger 178. First tab-receiving aperture 134 is rectangular to receive rectangular detent 176 of first tab 158. Second tab-receiving aperture 136 has a pair of semi-circular ends and a substantially straight portion positioned between the semi-circular ends to receive circular detent 180. According to alternative embodiments of the present disclosure other shapes and configurations of detents and tab-receiving apertures are provided. For example, according to one alternative embodiment of the present disclosure, both detents are circular. According to other alternative embodiments, other shapes such as squares, triangles, ovals, and other shapes known to those of ordinary skill in the art.

Detents 176, 180 are configured to facilitate coupling of first and second housings 128, 130 together. As shown in FIG. 8, each detent 176, 180 includes a chamfered edge 182, 184. During assembly of first housing 128 on second housing 130, chamfered edges 182, 184 contact a lower edge 186 of perimeter wall 138 of first housing 128. This contact causing dents 176, 180 to cam inwardly and fingers 174, 178 to flex inwardly until detents 176, 180 are positioned on an inner surface 188 of perimeter wall 138.

As first and second housings 128, 130 are pressed together, detents 176, 180 continue to slide over inner surface 188. When detents 176, 180 are positioned over tab-receiving apertures 134, 136, they snap into place, as shown in FIG. 5, and couple first and second housings 128, 130 together.

To remove second housing 130 from first housing 128, a person presses inwardly on rectangular dents 176 to remove detents 176 from tab-receiving apertures 134. The air pressure in the pneumatic lines urges first and second housings 128, 130 apart, but circular detents 180 remain in apertures 136, as shown in FIG. 7, to block full separation of first and second housings 128, 130. When in this position, couplings 142, 148 are spaced apart and permit venting of the pneumatic lines.

To fully remove second housing 130 from first housing 128, a person presses inwardly on circular detents 180 to remove detents 180 from tab-receiving apertures 136. Because all detents 176, 180 are removed from their respective tab-receiving apertures 134, 136, first and second housings 128, 130 can be fully uncoupled.

As shown in FIGS. 7 and 10, pneumatic coupling 110 is configured to permit mounting of another pneumatic coupling 110 thereto. First housing 128 includes a mounting tab 190 and a pair of tracks 192 coupled to perimeter wall 138. First housing 128 further includes a pair of track-receiving grooves 194 and a detent 196 coupled to an opposite side of perimeter wall 138. Track-receiving grooves 194 are configured to receive tracks 192 of another pneumatic coupling 110 and detent 196 is configured to catch a detent 198 of mounting tab 190 of the other pneumatic coupling 110 to permit any number of pneumatic couplings 110 to be coupled together. To remove one pneumatic coupling 110 from another, tab 190 is pushed toward perimeter wall 138 so that tab 190 can move over detent 196.

Figure 11:
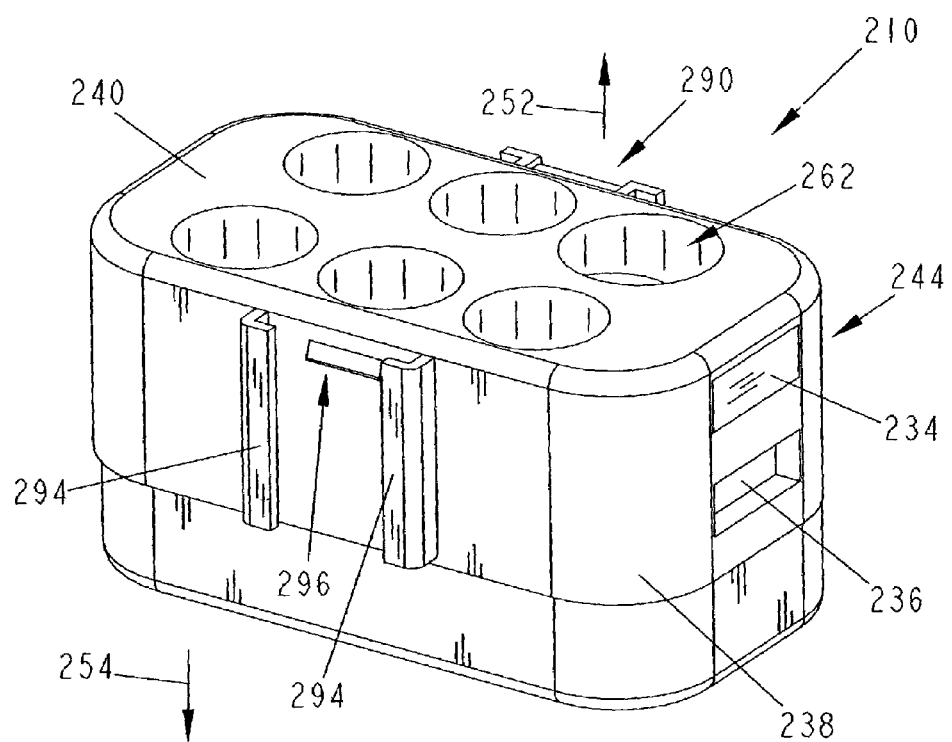
FIG. 11 is a perspective view of another pneumatic coupling according to the present disclosure showing the coupling including a first housing and a second housing coupled to the first housing.
Figure 12:
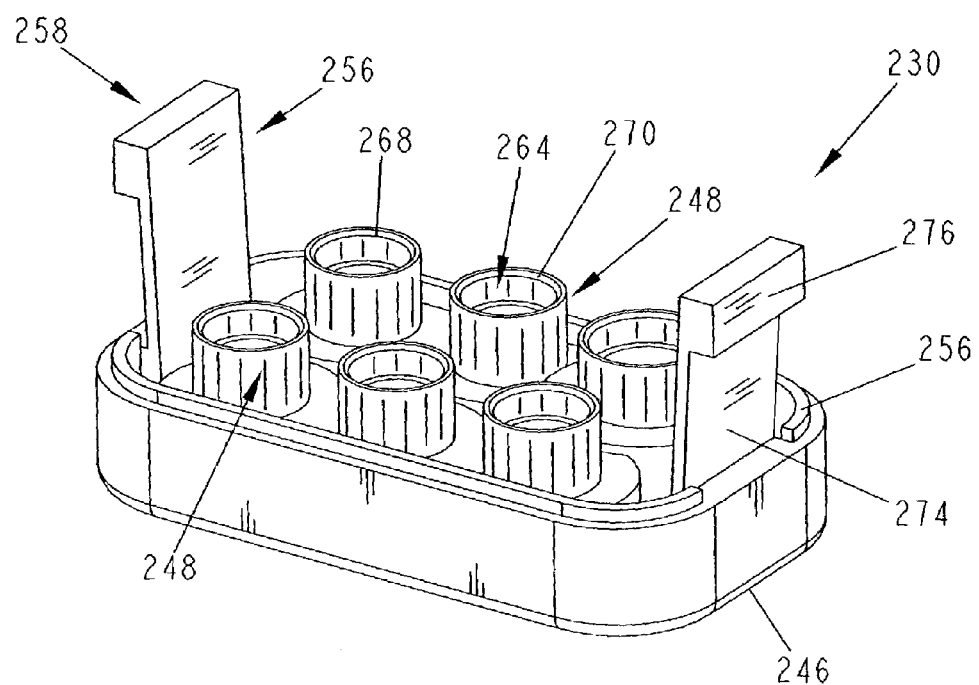
FIG. 12 is a perspective view of the second housing of FIG. 11 showing the second housing including a base, a substantially rectangular wall, six female bosses or couplings coupled to the base, and two tabs coupled to the base.
Figure 13:
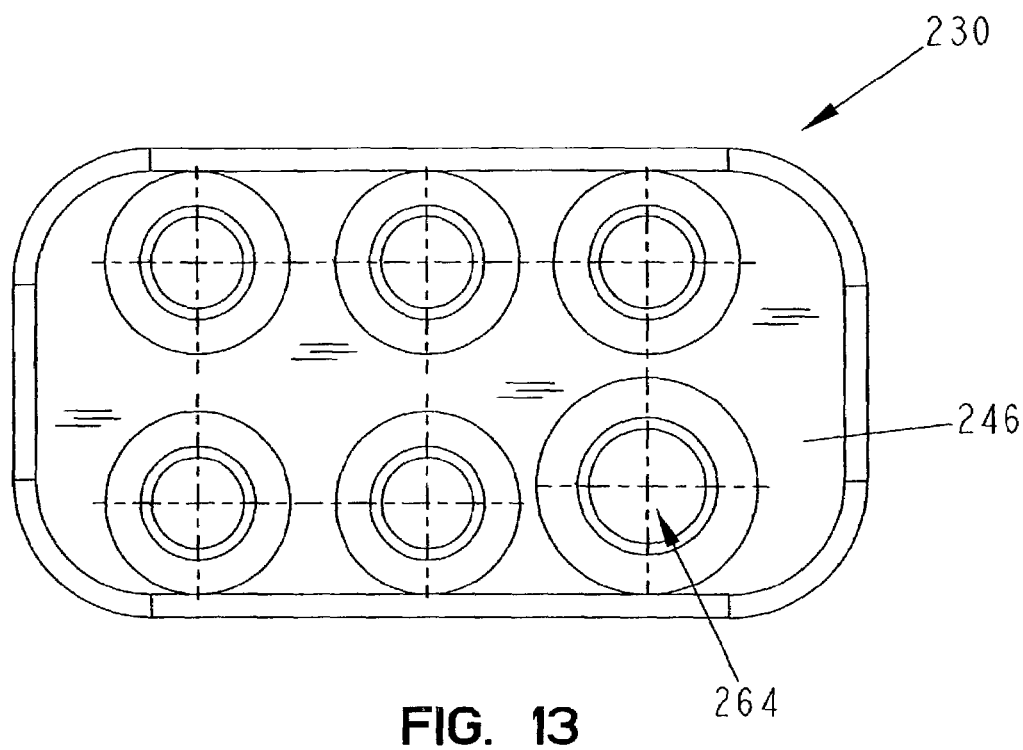
FIG. 13 is a top plan view of the second housing of FIG. 11 showing the second housing further including six apertures in communication with the six female couplings.
Figure 14:
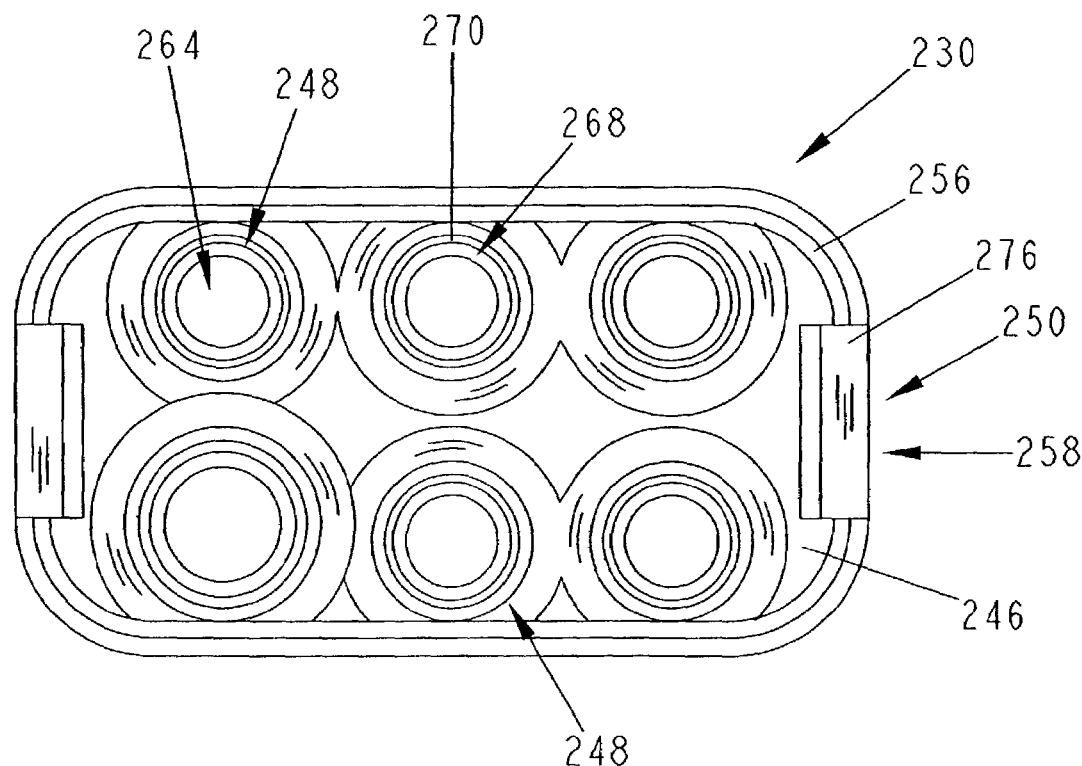
FIG. 14 is a bottom view of the second housing of FIG. 11 showing the six female couplings.

A second embodiment pneumatic coupling 210 is shown in FIGS. 11–18 As shown in FIG. 11, pneumatic coupling 210 includes a first housing 228 configured to couple to a set of six pneumatic lines (not shown), such as pneumatic lines 26 of cab 16, and a second housing 230 configured to couple to another set of six pneumatic lines (not shown), such as pneumatic lines 22 of chassis 14. First and second housings 228, 230 are configured to couple together and provide communication of air between the two sets of pneumatic lines to facilitate delivery of air between the pneumatic components. First housing 228 is configured to couple to a housing (not shown) of a pneumatic system tester, such as tester 36, and second housing 230 is configured to couple to another housing of the tester to perform test on the pneumatic systems of a vehicle as described above.

Figure 15:
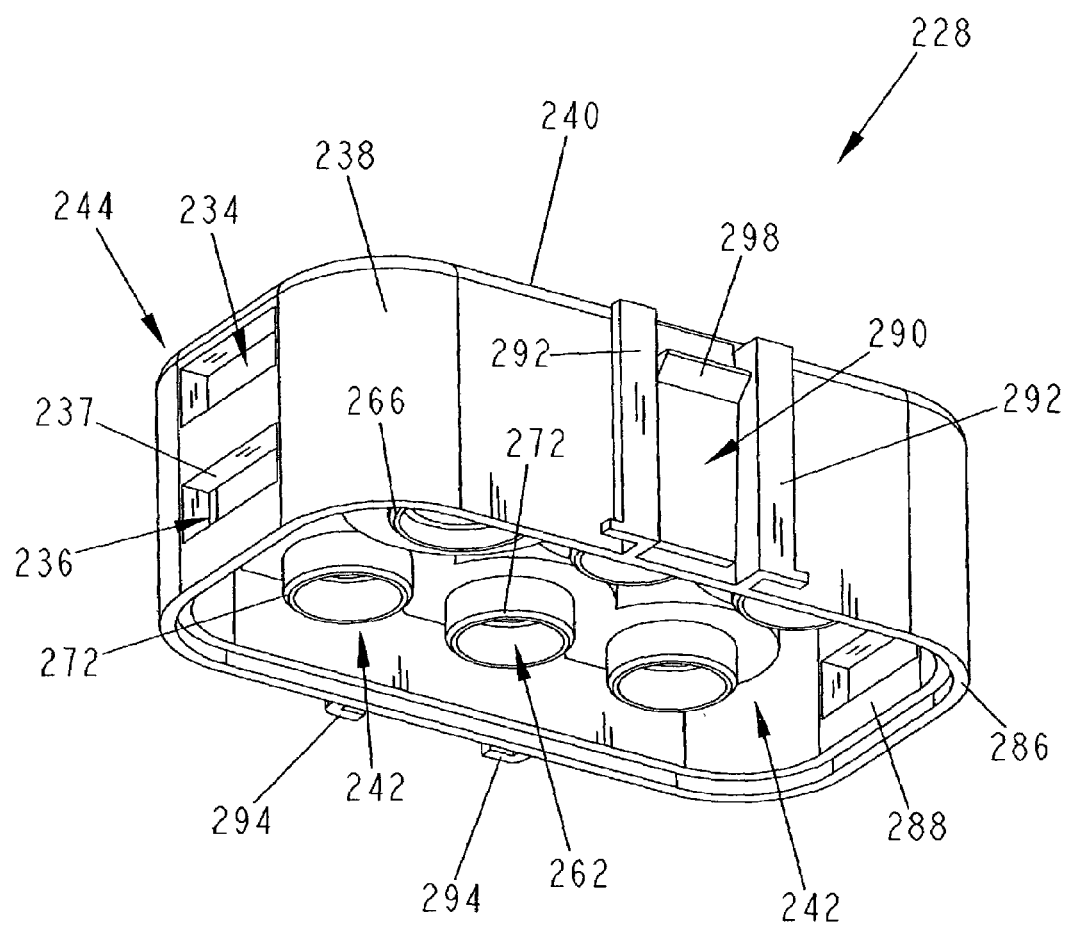
FIG. 15 is a perspective view of the first housing of FIG. 11 showing the first housing including a base, a substantially rectangular perimeter wall sized to receive the perimeter wall of the second housing therein, six male bosses or couplings sized to fit in the female couplings of the second housing, two set of tab-receiving apertures defined in the perimeter wall and sized to receive the tabs of the second housing therein, and a mounting tab and pair of tracks coupled to an outer surface of the perimeter wall.
Figure 16:
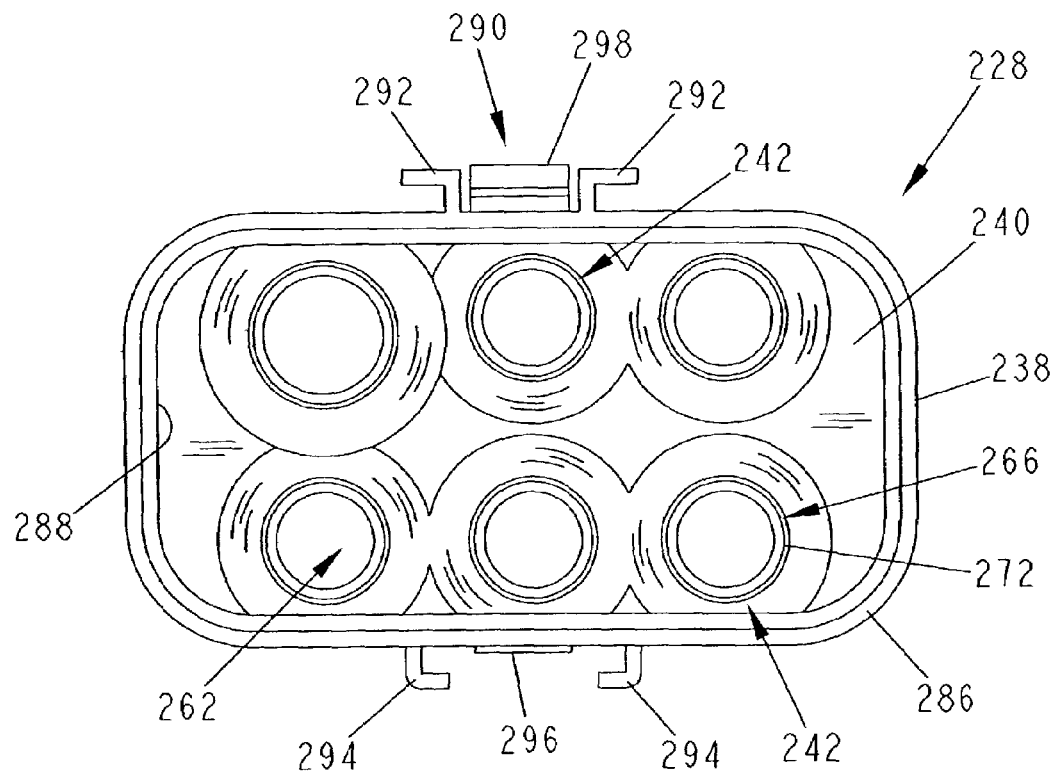
FIG. 16 is a bottom view of the first housing of FIG. 11 showing the six male couplings.
Figure 17:
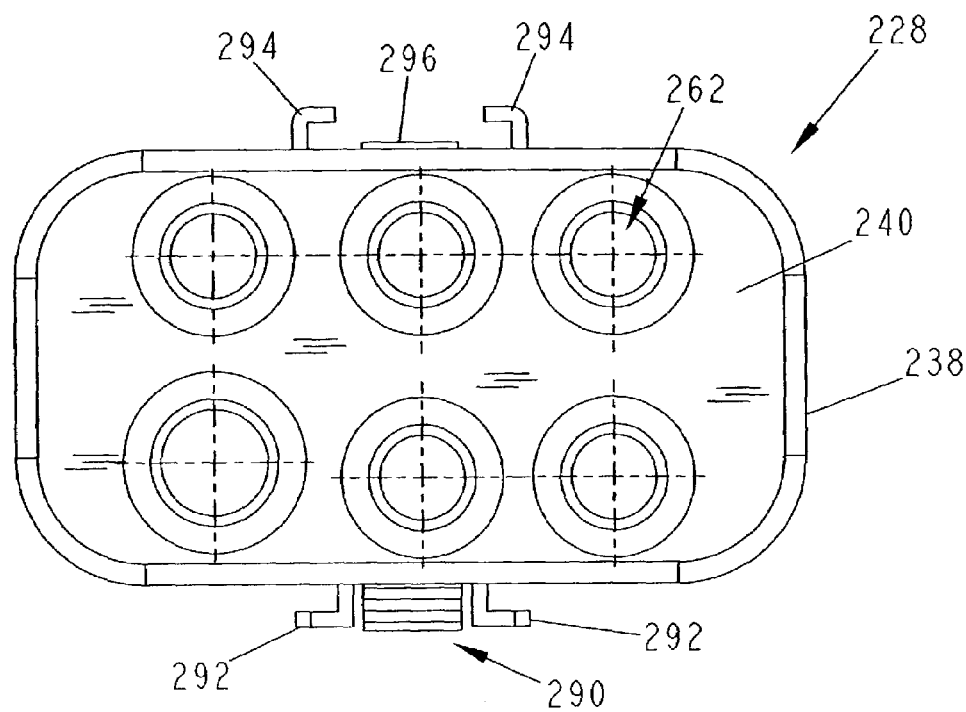
FIG. 17 is a top plan view of the first housing of FIG. 11 showing the first housing further including six ports in communication with the six male couplings.
Figure 18:
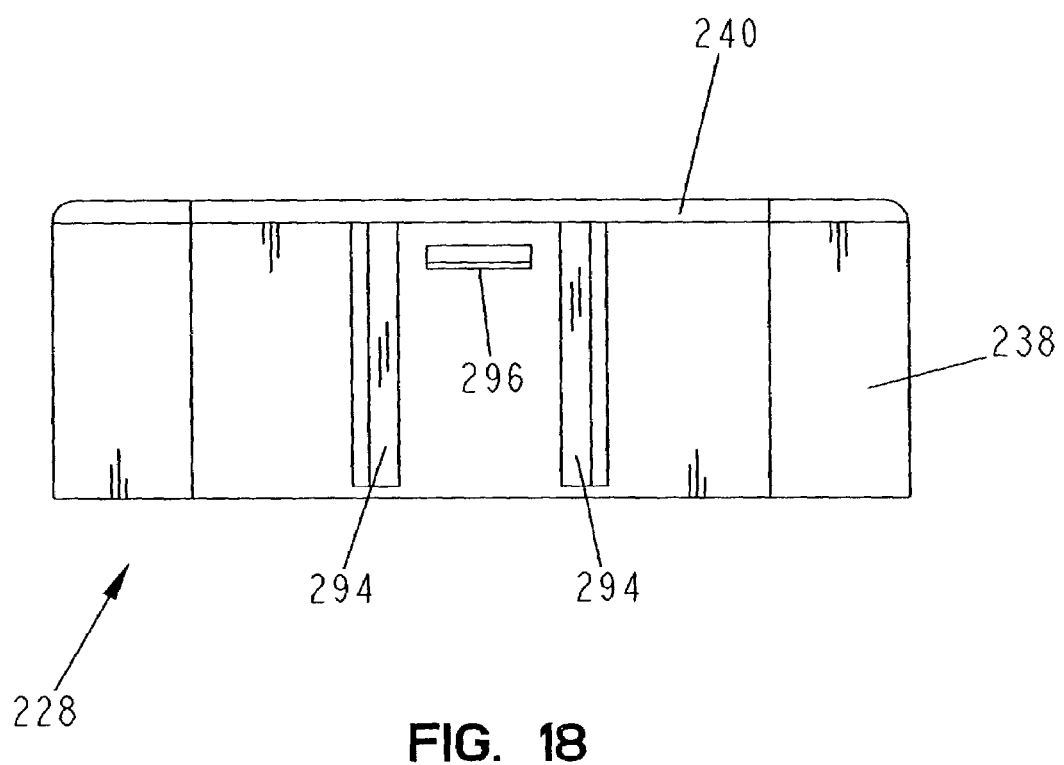
FIG. 18 is a side elevation view of the first housing of FIG. 11 showing a pair of track-receiving grooves coupled to an other surface of the perimeter wall and sized to receive the tracks and a detent coupled to the perimeter wall.
Figure 19:
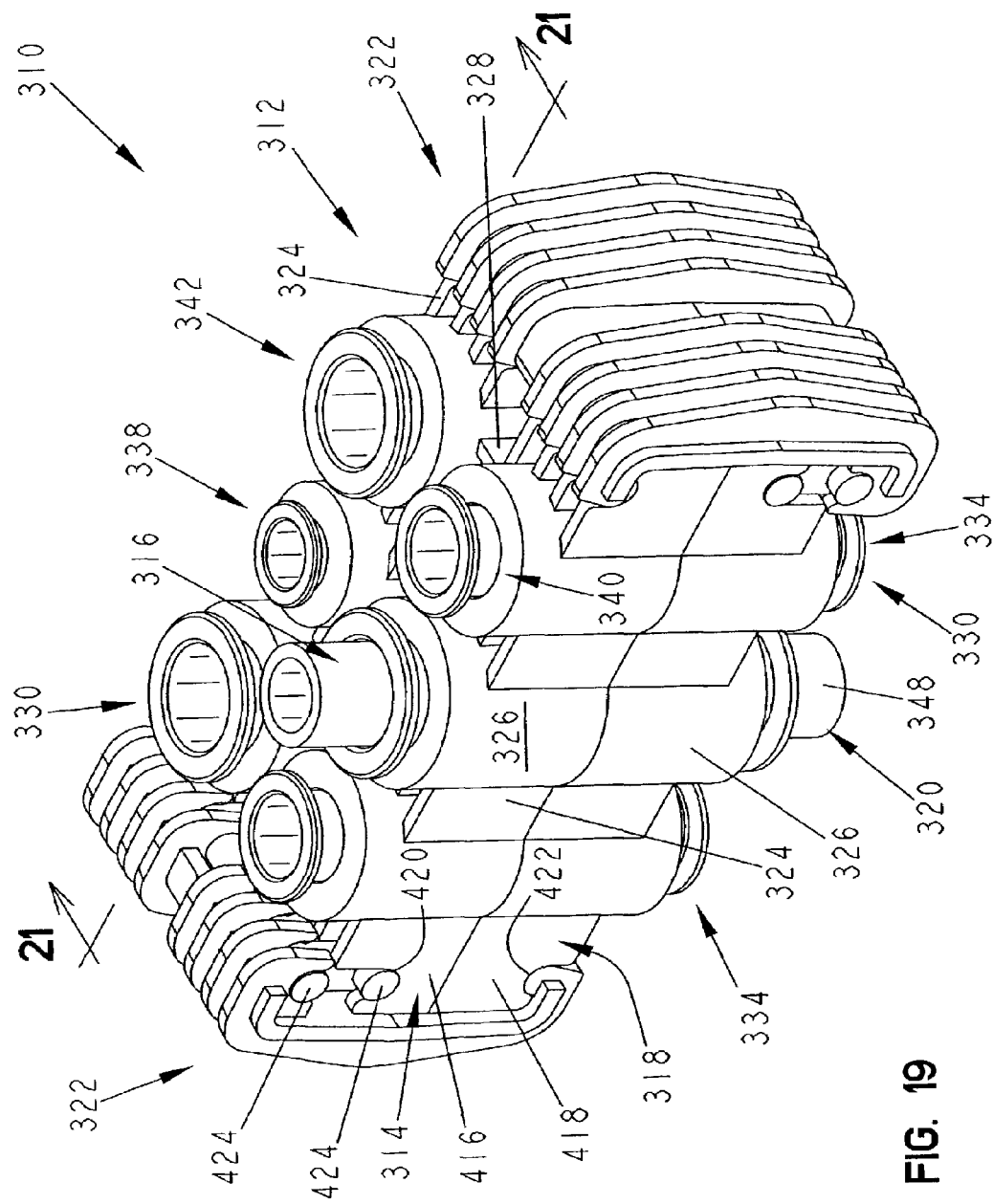
FIG. 19 is a perspective view of another alternative embodiment pneumatic coupling.

As shown in FIG. 15, first housing 228 includes a base 240, a plurality of male bosses or internal couplings 242 coupled to base 240, a perimeter wall 238 coupled to base 240, and a fastener or coupler 244 including first and second tab-receiving apertures 234, 236 formed in perimeter wall 234. Second housing 230 includes a base 246, a perimeter wall 256 sized to fit within perimeter wall 238 of first housing 228, a plurality of female bosses or couplings 248 coupled to base 246, and a pair of couplers 250 including a flexible tab 258 coupled to base 246.

First and second housings 228, 230 further include a plurality of ports/cartridges/fittings (not shown) positioned in respective apertures 262, 264 that extend through respective bases 240, 246 (the ports are substantially identical to ports 159 described above). Pneumatic lines are plugged into the ports to provide communication of air between the pneumatic lines and respective female and male couplings 242, 248 of first and second housings 228, 230.

When first housing 228 is coupled to second housing 230, as shown in FIG. 11, female couplings 242 receive male couplings 248 to provide communication of air between the pneumatic lines. O-rings (not shown) are provided between female and male couplings 242, 248 to provide a seal therebetween.

Each female coupling 248 includes a shoulder-receiving aperture 268. Each male coupling 242 includes a shoulder 266 sized to fit within a respective shoulder-receiving aperture 268 of female coupling 248. Each shoulder 266 of male coupling 242 includes a chamfered edge 272 and each female coupling 248 includes a corresponding chamfered edge 270 that assists in guiding shoulders 266 into shoulder-receiving apertures 268.

Couplers 244 of first housing 228 cooperate with couplers 250 of second housing 230 to secure bases 240, 246 and couplings 242, 248 together to maintain the communication of air between the pneumatic lines coupled to the ports. Couplers 244, 250 also cooperate to permit slight separation of couplings 242, 248, but continue to secure bases 240, 246 together.

When couplings 242, 248 are separated, air is no longer communicated between the pneumatic lines. Furthermore, during initial separation of couplings 242, 248, pressurized air within the pneumatic lines has a tendency to push housings 228, 230 apart in directions 252, 254. Couplers 244, 250 are configured to block complete separation of housings 228, 230 when couplings 242, 248 are separating.

Couplers 244, 250 are also configured to permit complete separation of housings 228, 230. After couplings 242, 248 are separated and the initial surge of pressurized air in the pneumatic lines has dissipated, the assembler, maintenance technician, or other person can release couplers 244, 250 and fully remove second housing 230 from first housing 228.

As previously mentioned, couplers 250 include flexible tab 258 coupled to base 246. Flexible tab 258 includes a flexible finger 274 having a proximal end coupled to base 246 and a detent 276 coupled to a distal end of finger 274. Tab-receiving aperture 234 is rectangular to receive detent 276. Similarly, second tab-receiving aperture 236 is rectangular to receive detent 276.

Detent 276 is configured to facilitate coupling of first and second housings 228, 230 together. Detent 276 includes a chamfered edge 282. During assembly of first housing 228 on second housing 230, chamfered edge 282 contacts a lower edge 286 of perimeter wall 238 of first housing 228. This contact causing dents 176 to cam inwardly and fingers 274 to flex inwardly until detents 176 are positioned on an inner surface 288 of perimeter wall 238.

As first and second housings 228, 230 are pressed together, detents 276 continue to slide over inner surface 288. When detents 276 are positioned over tab-receiving apertures 236, they snap into apertures 236. When detents 276 are positioned over tab-receiving apertures 234, they snap into apertures 234 to hold first and second housings 228, 230 together.

To remove second housing 230 from first housing 228, a person presses inwardly on rectangular dents 276 to remove detents 276 from tab-receiving apertures 234. The air pressure in the pneumatic lines urges first and second housings 228, 230 apart, until detents 276 snap into apertures 236 to block full separation of first and second housings 228, 230. When in this position, couplings 242, 248 are spaced apart and permit venting of the pneumatic lines.

To fully remove second housing 230 from first housing 230, a person presses inwardly on detents 276 to remove detents 176 from tab-receiving apertures 236. Because detents 176 are removed from tab-receiving apertures 234, 236, first and second housings 228, 230 can be fully uncoupled.

As shown in FIG. 11, pneumatic coupling 210 is configured to permit mounting of another pneumatic coupling 210 thereto. First housing 228 includes a mounting tab 290 and a pair of tracks 292 coupled to perimeter wall 238. First housing 228 further includes a pair of track-receiving grooves 294 and a detent 296 coupled to an opposite side of perimeter wall 238. Track-receiving grooves 294 are configured to receive tracks 292 of another pneumatic coupling 210 and detent 296 is configured to catch a detent 298 of mounting tab 290 of the other pneumatic coupling 210 to permit any number of pneumatic couplings 210 to be coupled together. To remove one pneumatic coupling 210 from another, tab 290 is pushed toward perimeter wall 238 so that tab 290 can move over detent 296.

Figure 20:
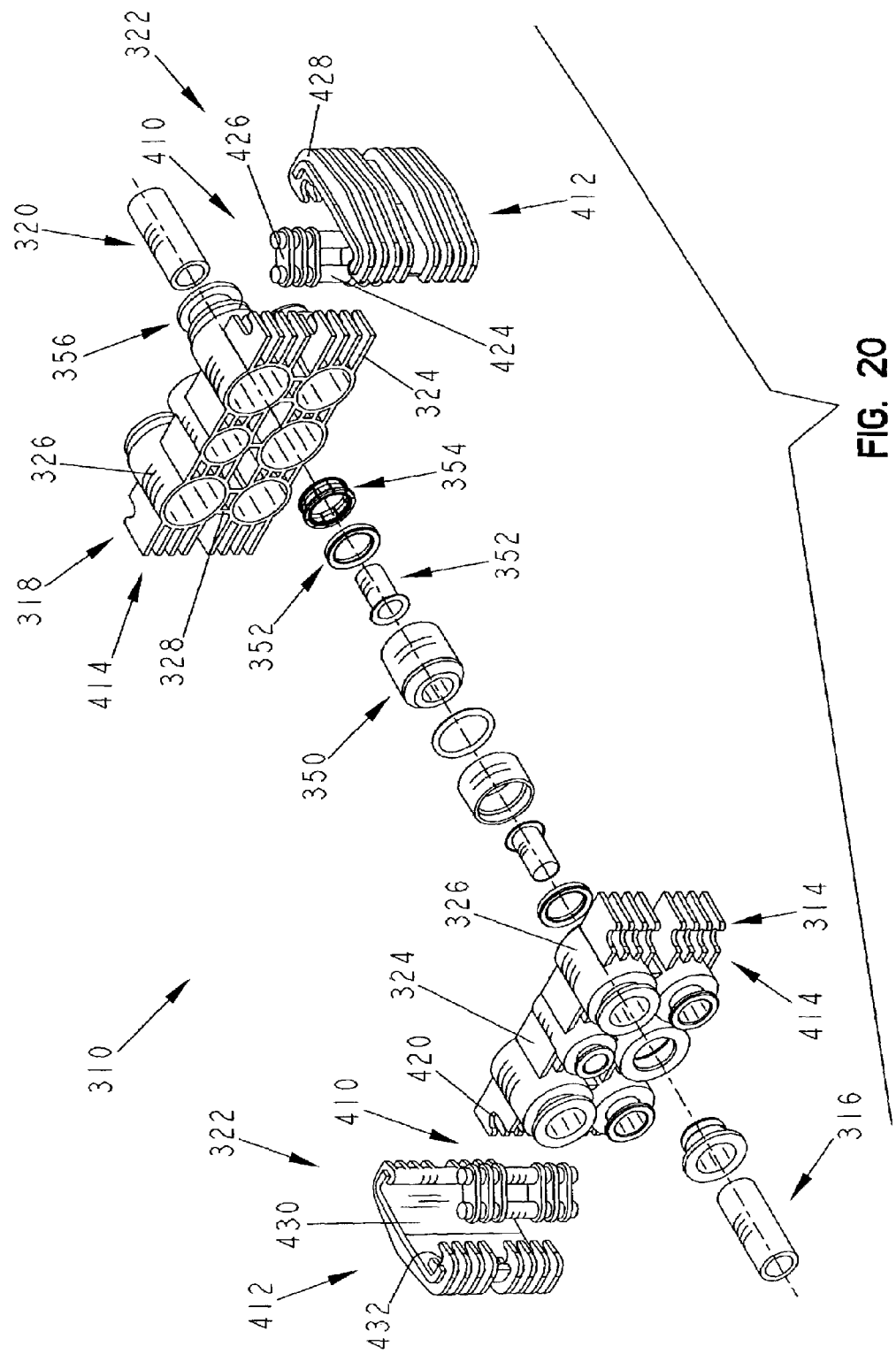
FIG. 20 is an exploded perspective view of the pneumatic coupling of FIG. 19 showing the coupling including a two-piece housing having a plurality of ribs, a plurality of pneumatic fittings, and a pair of over-center latches.

A third embodiment pneumatic coupling 310 is shown in FIGS. 19–22. As shown in FIG. 20, pneumatic coupling 310 includes a housing 312 including a first housing 314 configured to couple to a set of six pneumatic components or pneumatic supply lines 316 (shown in FIGS. 21 and 22), such as pneumatic lines 26 of cab 16, and a second housing 318 configured to couple to another set of six pneumatic components or pneumatic receiving lines 320, such as pneumatic lines 22 of chassis 14. Second housing 318 is substantially identical to first housing 314. According to alternative embodiments of the present disclosure, the pneumatic couplings disclosed herein are configured to fluidly couple pneumatic components other than pneumatic lines such as valves, pressure regulators, switches, vents, or any combination of these and other pneumatic components known to those of ordinary skill in the art.

Pneumatic coupling 310 further includes a pair of couplers 322 configured to couple first and second housings 314, 318 together. First and second housings 314, 318 are configured to couple together by couplers 322 and provide sealed fluid communication of air between the two sets of pneumatic lines to facilitate delivery of air between the pneumatic components. First housing 314 is configured to couple to a housing (not shown) of a pneumatic system tester, such as tester 36, and second housing 318 is configured to couple to another housing of the tester to perform test on the pneumatic systems of a vehicle as described above.

As shown in FIG. 9, first and second housings 314, 318 include a plurality of parallel ribs 324, a plurality of channel bodies 326 coupled to ribs 324, and a plurality of webs 328 extending between channel bodies 326. According to the preferred embodiment of the present disclosure, eight ribs 324 are provided and six channel bodies 326 are provided. Each channel body 326 is integrally coupled to four ribs 324. Six webs 328 are provided that extend between and are integrally coupled with adjacent channel bodies 326. As shown in FIG. 20, ribs 324 cooperate to define a plurality of grooves 329 therebetween that are interrupted by channel bodies 326. According to alternative embodiments of the present disclosure, fewer or more ribs, channel bodies, and webs are provided.

Pneumatic coupling 310 further includes a plurality of pneumatic line couplers or fittings 330 configured to receive pneumatic lines 316, 320. Channel bodies 326 are configured to receive fittings 330 to provide communication of air between pneumatic lines 316, 320.

Plurality of line fittings 330 includes males fittings 332, 334, 336 sized to receive respective ¼ inches (6.43 millimeters), ⅜ inch (9.63 millimeters), and ½ inch (12.83 millimeters) pneumatic lines 344, 346, 348 of plurality of pneumatic lines 316. Plurality of line fittings 330 further includes female fittings 338, 340, 342 sized to receive respective ¼ inches (6.43 millimeters), ⅜ inch (9.63 millimeters), and ½ inch (12.83 millimeters) pneumatic lines 344, 346, 348 of plurality of pneumatic lines 320. Channel bodies 326 are sized to receive the differently sized male and female fittings 332, 334, 336, 338, 340, 342.

Pneumatic lines 316, 320 are preferably made of Nylon 12. According to alternative embodiments of the present disclosure, the pneumatic lines are provided of different sizes and materials known to those of ordinary skill in the art.

Respective female fittings 338, 340, 342 are substantially similar to each other. Therefore, only female fitting 338 will be described in detail. Similarly, male fittings 332, 334, 336 are substantially similar and share several similar components included in female fitting 338. Only male fitting 332 will be described in detail including differences from female fitting 338.

Female fitting 338 includes a tapered base or plug 350 made of PBT (polybutylene terephthalate) plastic, a tubular tube support 352 made of brass, an annular packing seal 352 made of NBR (nitrile) rubber, an annular tube chuck 354 made of brass, and an tubular chuck release 356 made of POM (polyoxymethylene, polyacetal) plastic. According to alternative embodiments of the present disclosure, other materials known to those of ordinary skill in the art are used for the various components such as other plastic materials and other metals. According to one alternative embodiment, the components made of PBT are made of nylon reinforced with 10%–30% fiberglass.

To assembly female fitting 338, tube support 352 is press fit into a first stepped portion 358 of plug 350 and seal 352 is positioned in a second stepped portion 360 of plug 350. Plug 350 has a maximum diameter or width that is greater than a minimum diameter or width of aperture 368. Plug 350 is then press fit into an interior end 362 of a channel 364 defined by one of channel bodies 326. Next, tube chuck 354 is inserted in an exterior end 366 of channel 364. Tube chuck 354 includes a plurality of slits (not shown) that permit the outside diameter of tube chuck 354 to be decreased to fit through exterior aperture 368 of housing 318. Simultaneously or thereafter, chuck release 356 is inserted through exterior aperture 368.

Figure 23:
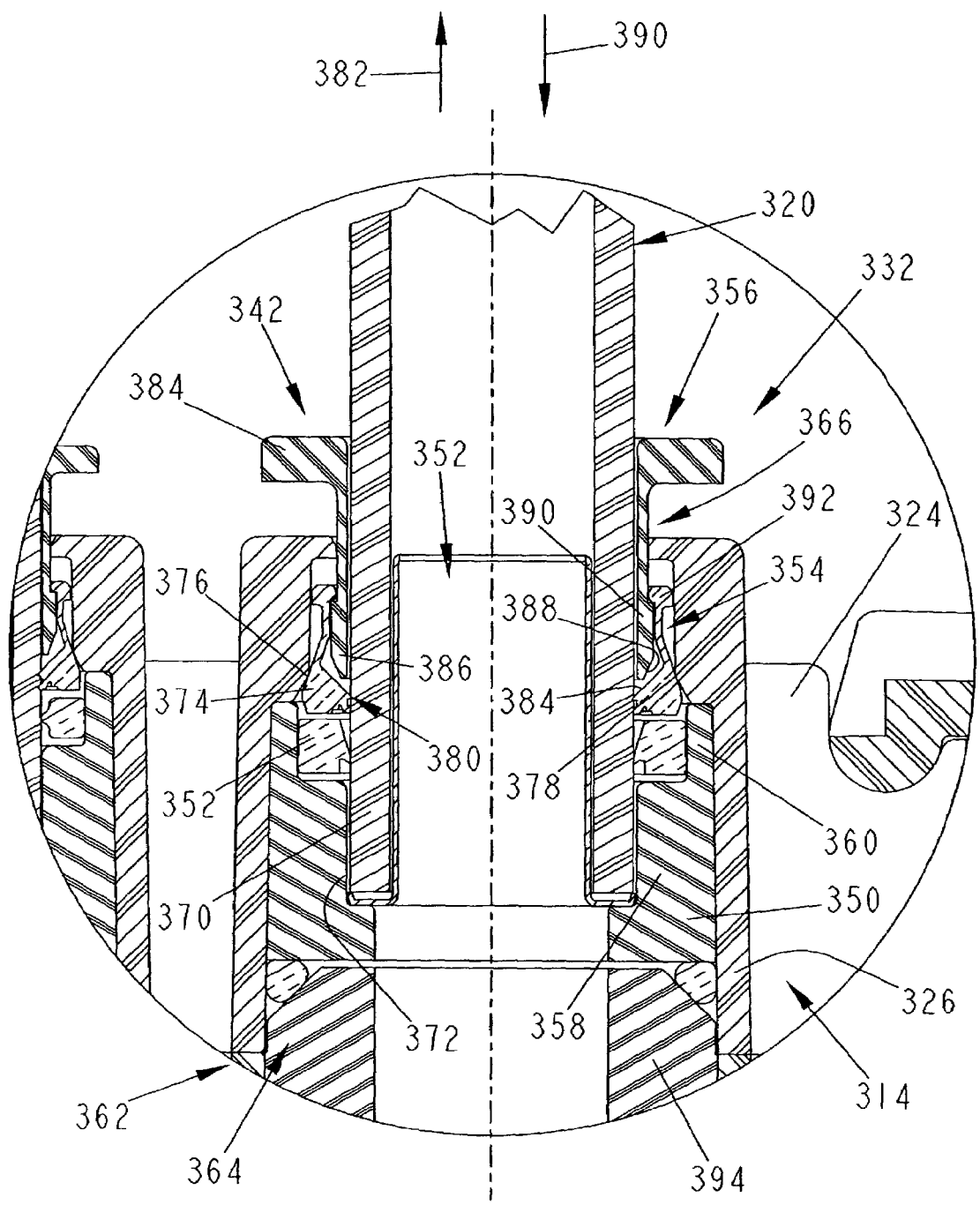
FIG. 23 is an enlarged view of a portion of FIG. 21 showing enlarged details of one of a plurality of pneumatic line fittings.

One of pneumatic lines 320 is shown in FIG. 23 coupled to one of fittings 330. To couple pneumatic line 320 to fitting 330, an open end 370 of pneumatic line 320 is inserted into chuck release 356 and slide over tube support 352. Seal 352 is compressed between an exterior surface 372 of end 370 and second stepped portion 360 of plug 350 to provide a seal between the respective pneumatic line 320 and plug 350.

Tube chuck 354 blocks withdraw of the respective pneumatic line 316, from fitting 330. As shown in FIG. 23, tube chuck 354 includes a cam portion 374 having a cam surface 376 that is positioned adjacent to a ramp surface 378 of channel body 326. Cam portion 374 also includes a plurality of annular serrations or teeth 380 positioned adjacent to exterior surface 372 of pneumatic line 316.

If pneumatic line 316 is pulled in direction 382 away from housing 314, cam portion 374 of tube chuck 354 is also pulled in direction 382 because teeth 380 of cam portion 374 slightly grip exterior surface 372 and move with pneumatic line 316 as it is pulled in direction 382. As cam portion 374 moves in direction 382, cam surface 376 rides on ramp surface 378 of channel body 326 creating radial forces that push cam portion 374 radially inwardly. The radially inward movement of cam portion 374 causes teeth 380 and tube support 352 to clamp pneumatic line 316 therebetween with teeth 380 "biting" into pneumatic line 316. The force in combination with teeth 380 biting into pneumatic line 316 resists further withdraw of pneumatic line 316 from fitting 330.

Chuck release 356 is configured to disengage tube chuck 354 from pneumatic line 316 to permit withdraw of pneumatic line 316. As shown in FIG. 23, chuck release 356 includes an annular lip portion 384 and a cam portion 386 with a cam surface 388. Cam portion 374 of tube chuck 354 includes a second cam surface 384. Chuck release 356 further includes a shoulder portion 390 that contacts a complementary shoulder portion 392 of tube chuck 354 that prevents chuck release 356 from falling out of tube chuck 354.

To disengage tube chuck 354 from pneumatic line 316, a user pushes lip portion 384 in direction 390, opposite direction 382. Cam surface 388 of chuck release 356 contacts second cam surface 384 of tube chuck 354 and pushes cam portion 386 with teeth 380 radially outward away from pneumatic line 316. Thus, teeth 380 no longer block withdraw of pneumatic line 316 in direction 382.

Figure 21:
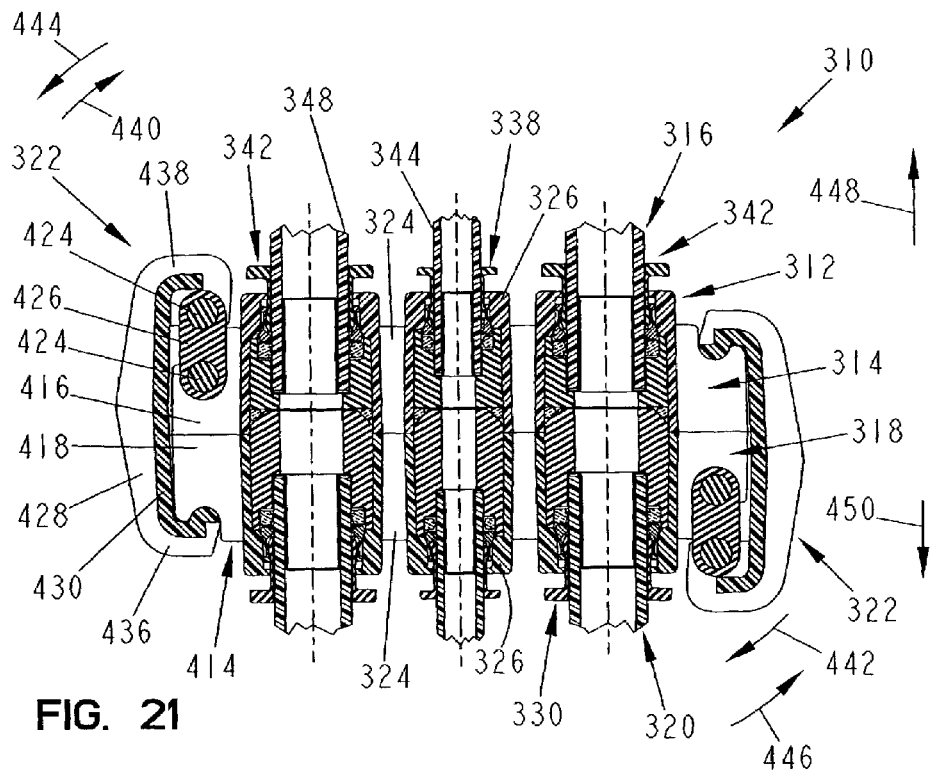
FIG. 21 is a cross-sectional view taken through line 21—21 of FIG. 19 showing the two piece housing coupled together by the over-center latches.
Figure 22:
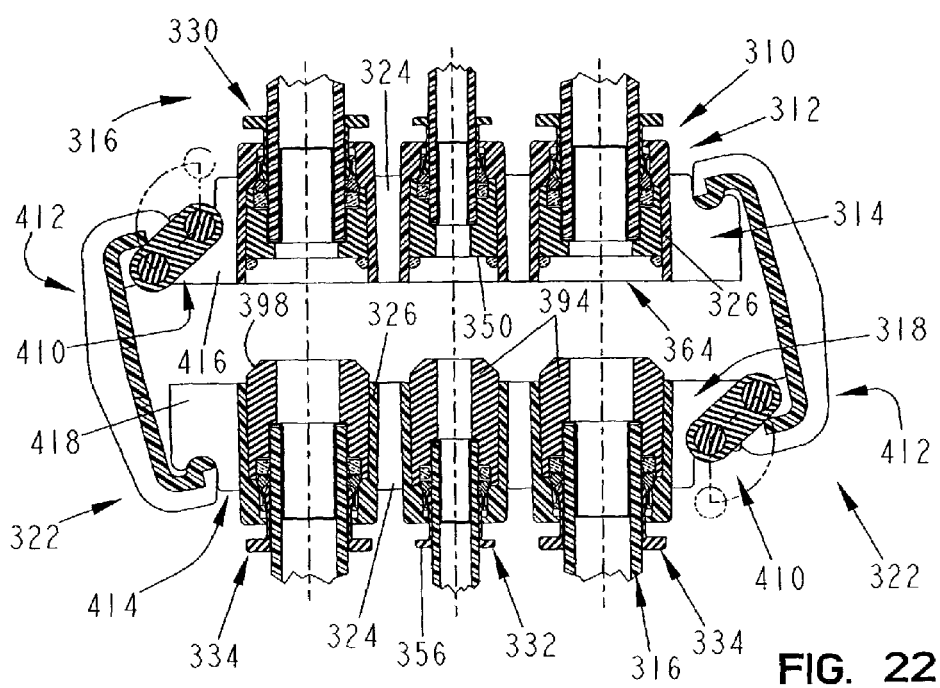
FIG. 22 is a view similar to FIG. 21 showing the two-piece housing in a partially coupled position.

When first housing 314 is coupled to second housing 318, as shown in FIG. 21, plugs 394 of male fittings 332, 334, 336 are received by respective channel bodies 326 of second housing 318. As shown in FIG. 22, plugs 350 of female fittings 338, 340, 352 are shorter than plugs 394 to provide space for plugs 394.

O-rings 396 are provided between respective plugs 350, 394 to provide a seal therebetween. As shown in FIG. 22, plugs 394 includes a chamfered surface 398 to facilitate insertion of plugs 394 of male fittings 332, 334, 336 into channel bodies 326 of second housing 318.

As shown in FIG. 20, couplers 322 are preferably over-center latches having an aluminum link 410 and a latch member 412 made out of PBT plastic material. Each link 410 is pivotably coupled to one of housings 314, 318. Each latch member 412 is pivotably coupled to one of links 410.

Ribs 324 of housings 314, 318 are configured to provide pivot locations for links 410 and a latch keeper 414 on which latch member 412 couples. As shown in FIG. 21, each rib 324 includes a pair of cantilevered portions 416, 418 that extend away from respective channel bodies 326. Each cantilevered portion 416 includes a notch 420 sized to receive a portion of one of links 410 to define the pivot location. Similarly, each cantilevered portion 418 includes a notch 422 sized to receive latch member 412 to define latch keeper 414.

Links 410 includes a pair of pivot pins 424 and a six link members 426 rigidly coupled to pivot pins 424. Notches 420 are sized so that pivot pins 424 snaps therein and permits pivoting of the respective pivot pin 424.

Latch members 412 are C-shaped and include eight C-shaped ribs 428 and a C-shaped web 430 that is integral with C-shaped ribs 428. Each rib 428 includes a notch 432 sized to receive one of pivot pins 424 of link 410 so that the pin 424 snaps therein and permits pivoting of the respective pivot pin 424. As shown in FIG. 23, ribs 428 and web 430 cooperate to define a rounded catch portion 434 sized to fit into notches 422 of ribs 324 of housings 314, 318 that defines keeper 414.

To assembly couplers 322 on housings 314, 318, pivot pins 424 are snapped into notches 420 so that link members 426 are positioned between respective ribs 324 of housings 314, 318. Similarly, the other pivot pins 424 are snapped into notches 432 of latch members 412.

To couple housings 314, 318 together, housings 314, 318 are aligned so that cantilevered portions 416 of housing 314 are adjacent to cantilevered portions 418 of housing 318 and vice versa. Next, catch portions 434 on first ends 436 of latch members 412 are positioned in keepers 414 as shown in FIG. 22. Opposite second ends 438 of latch members 412 are then pushed in directions 440, 442 toward respective housings 314, 318 causing pivot pins 424 coupled to second ends 438 of latch members 412 to move "over center" the pivot location of pivot pins 424 coupled to ribs 324. Tension is created in latch members 412 because they are in an over center position. This tension urges latch member 412 in respective directions 440, 442.

To separate housings 314, 318, a user grasps second ends 438 of latch members 412 and pulls in respective directions 444, 446 against the tension in latch members 412 until pins 424 coupled to latch members 412 move back over center of pivot pins 424 coupled to housings 314, 318. When housings 314, 318 are separated, air is no longer communicated between pneumatic lines 316, 320. Furthermore, during separation of housings 314, 318 pressurized air within pneumatic lines 316, 320 has a tendency to push housings 314, 318 apart in directions 448, 450.

Couplers 322 are configured to block initial complete uncoupling of housings 314, 318 when couplings latch members 412 move back from the over-center position. After latch member 412 move back from the over-center position, catch portions 434 remain in keepers 414. Thus, latch members 412 still couple housings 314, 318 together and restrain housings 314, 318 from moving beyond a predetermined location relative to one another. This restraint help housings 314, 318 from being "blown apart" from the release of air pressure in pneumatic lines 316, 320.

Couplers 322 are also configured to permit complete uncoupling of housings 314, 318. After latch members 412 are moved back from the over-center positions to the position shown in FIG. 22, a user can remove catch portions 434 from keepers 414 to fully uncouple the respective housings 314, 318.

Figure 24:
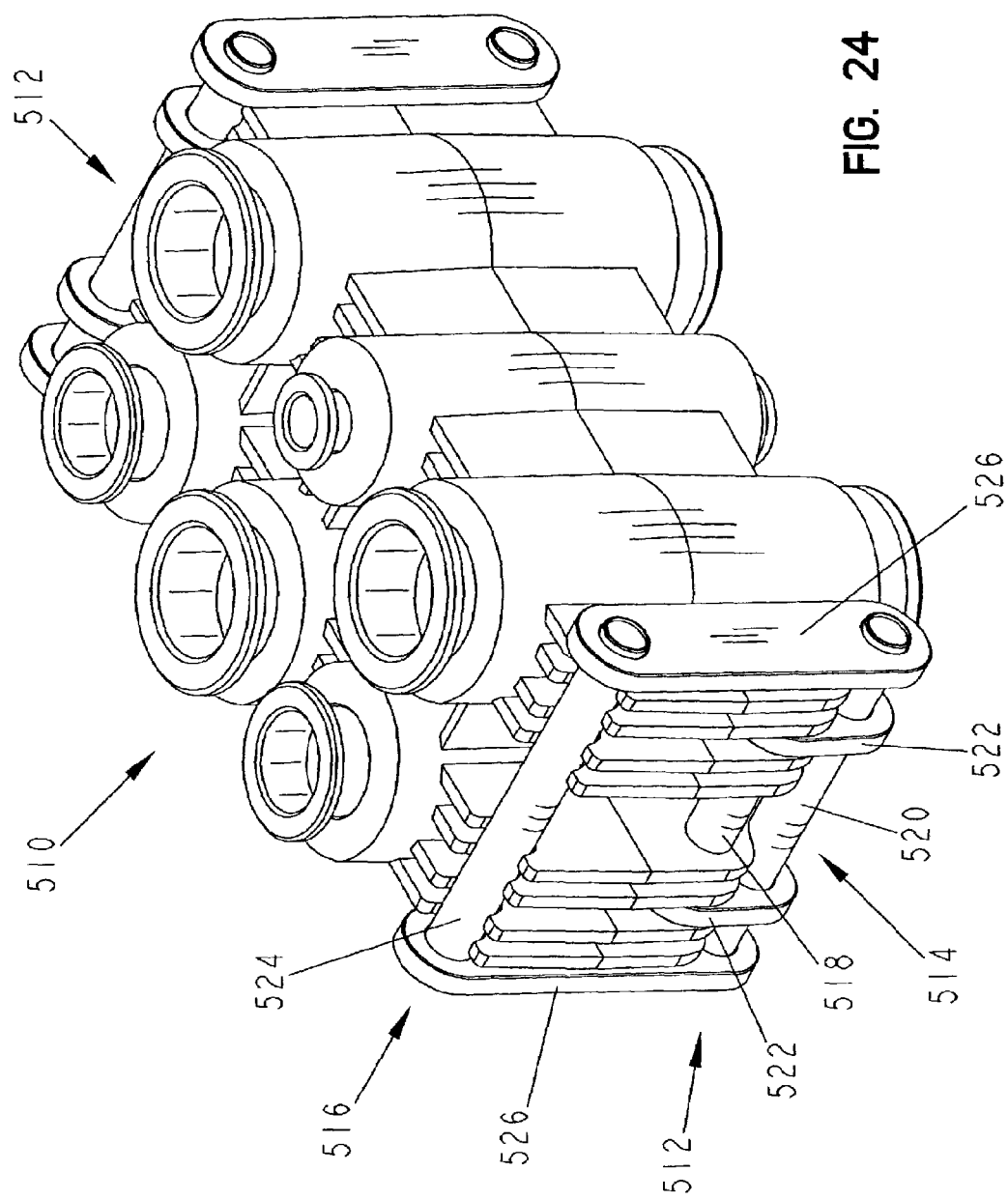
FIG. 24 is a perspective view of another alternative embodiment pneumatic coupling.

A fourth embodiment pneumatic coupling 510 is shown in FIG. 24. Pneumatic coupling 510 is substantially similar to pneumatic coupling 310. Pneumatic coupling 510 does includes a pair of couplers 512 that are different in some respects than couplers 322 of pneumatic coupling 310.

As shown in FIG. 24, couplers 512 are preferably over-center latches having an aluminum link 514 and an aluminum latch member 516. Each link 514 is pivotably coupled one of the housings. Each latch member 516 is pivotably coupled to one of links 514.

Each links 514 includes a pair of pivot pins 518, 520 and two link members 522 rigidly coupled to pivot pins 518, 520. Notches in the housings are sized so that shorter pivot pin 518 snaps therein and permits pivoting of link 514. Latch members 516 include a catch pin 524 and a pair of link members 526 that are rigidly coupled to catch pin 524 and pivotably coupled to pivot pin 520 of link 514. Similar to couplers 322, catch pin 524 fits in notches in the housings and moves to an over-center position to couple the housings together. According to alternative embodiments of the present disclosure, other configurations of over-center latches known to those of ordinary skill in the art are provided as couplers for the pneumatic couplings disclosed herein.

Figure 25:
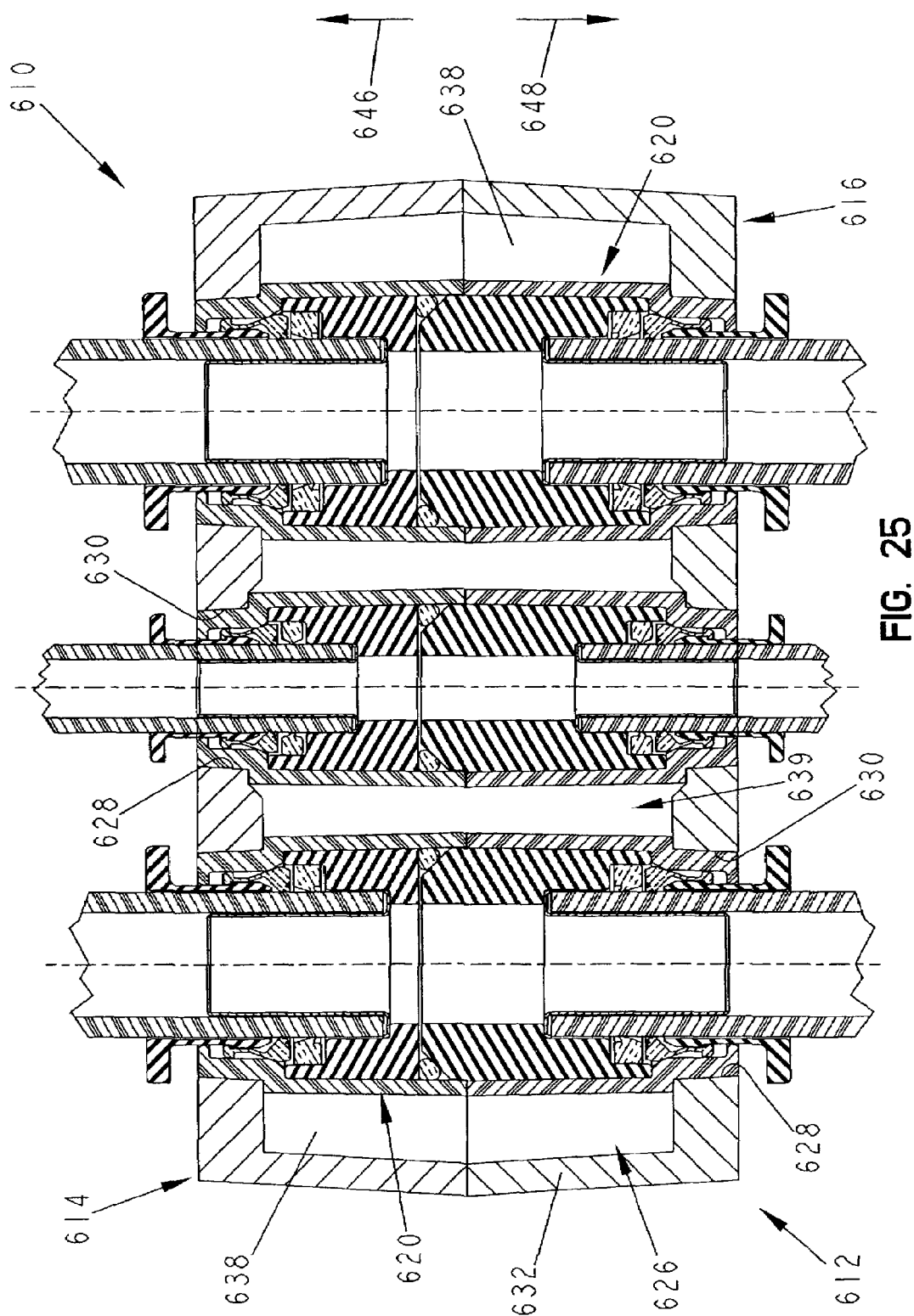
FIG. 25 is a cross-sectional view of another alternative embodiment pneumatic coupling.
Figure 26:
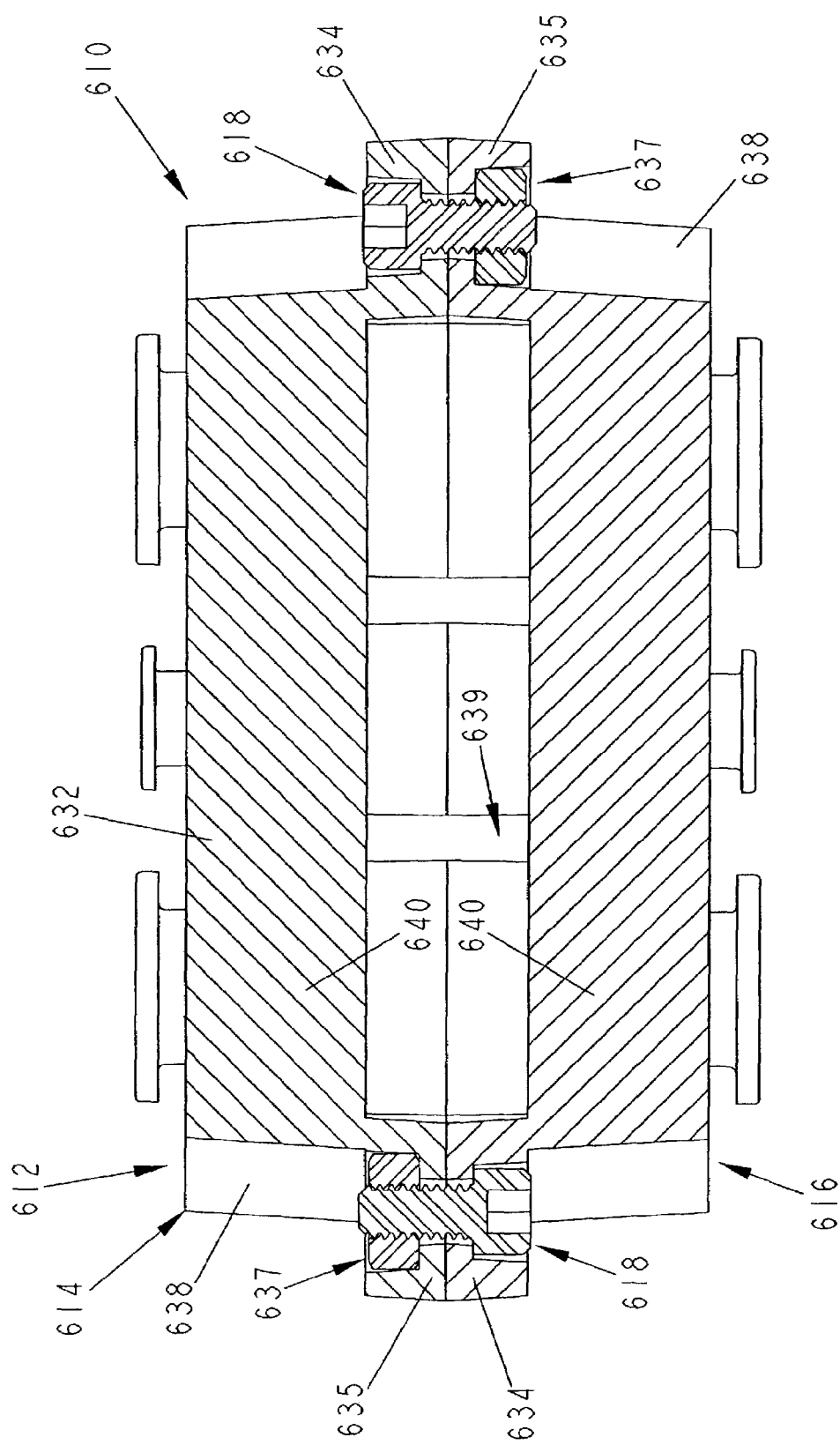
FIG. 26 is another cross-sectional view of the pneumatic coupling of FIG. 25.

A fifth embodiment pneumatic coupling 610 is shown in FIGS. 25 and 26. As shown in FIG. 25, pneumatic coupling 610 includes a shell or exterior housing 612 including a first housing 614 and a second housing 616 configured to be couple to first housing 614 by a pair of bolts 618. Preferably, first and second housings 614, 616 are made of aluminum. According to alternative embodiments of the present disclosure, the exterior housings are made of other suitable materials known to those of ordinary skill in the art such as other metals or plastic materials (such as PBT plastic) known to those of ordinary skill in the art.

Pneumatic coupling 610 further includes a plurality of internal housings or channel bodies 620 configured to couple to six pneumatic lines 316, such as pneumatic lines 26 of cab 16, and another set of six pneumatic lines 320, such as pneumatic lines 22 of chassis 14.

First and second housings 614, 616 cooperate to define an interior region 626 sized to receive internal housings 620. Each housing 614, 616 includes a plurality of apertures 628 defined by edges 630 that are sized to receive each respective internal housing 620 that is press fit therein. Plurality of apertures 628 are also sized to receive fittings 330 and pneumatic lines 316, 320.

Each first and second housings 614, 616 further includes a body portion 632 and a pair of flanges 634, 635 coupled to body portion 632. Flanges 635 includes a threaded nut 637 sized to threadingly receive bolts 618. Body portion 632 includes a pair of substantially flat side walls (not shown) and a pair of serrated end walls 638. Flat side walls 636 cooperate to define a window or opening 639 into interior region 626.

Each external housing 614, 616 includes a rib or web 640. The webs cooperate to divide interior region 626 in half. Fittings 330 provided on pneumatic coupling 610 are assembled in substantially the same manner to first and second housings 622, 624 as described above for housings 314, 316 of pneumatic coupling 310. One difference in the assembly process is that tube chucks 354 and chuck releases 356 are inserted through apertures 628 while being inserted into channel bodies 620.

To couple respective first and second housings 614, 616, 620, housings 614, 616 are aligned so that flange 635 of first housing 614 is positioned adjacent to flange 634 of second housing 616 and vice versa. Bolts 618 are than tightened to draw respective housings 616, 616, 620 together providing sealed fluid communication between the respective pneumatic lines 316, 320.

To separate inner housings 620, bolts 618 are backed out, releasing the clamping provided by outer housings 614, 616. When housings 620 are separated, air is no longer communicated between pneumatic lines 316, 320. Furthermore, during separation of housings 620, pressurized air within pneumatic lines 316, 320 has a tendency to push housings 620 apart in directions 646, 648.

Bolts 618 are configured to block initial complete uncoupling of housings 614, 616, 620 when bolts 618 are partially backed out. Because bolts 618 are only partially backed out, they continue to couple housings 614, 616, 620 together and restrain the respective housings 614, 616, 620 from moving beyond a predetermined location relative to one another. This restraint help housings 614, 616, 620 from being "blown apart" from the release of air pressure in pneumatic lines 316, 320. Bolts 618 are also configured to permit complete uncoupling of housings 614, 616, 620 by totally backing bolts 618 out of flanges 635.

Although the invention has been described in detail with reference to certain illustrated embodiments, variations and modifications exist within the scope and spirit of the present invention as described and defined in the following claims.

The invention claimed is:

1. A pneumatic device configured to supply pressurized air, the pneumatic device comprising
a plurality of pneumatic supply lines,
a plurality of pneumatic receiving lines configured to receive pressurized air from the plurality of pneumatic supply lines, and
a pneumatic coupling configured to couple and uncouple the plurality of pneumatic receiving lines from the plurality of pneumatic supply lines, the pneumatic coupling including a two-piece housing, a plurality of supply line fittings configured to receive the plurality of pneumatic supply lines, a plurality of receiving line fittings configured to receive the plurality of pneumatic receiving lines, and an over-center latch configured to couple the two-piece housing together, the two-piece housing including a pair of identical housings, each identical housing including a plurality of channel bodies defining channels sized to receive the plurality of supply and receiving line fittings and a plurality of parallel ribs coupled to the channel bodies, each of the ribs having a cantilevered portion extending away from at least one of the channel bodies, the channels having an exterior end and an interior end, the plurality of supply and receiving pneumatic lines being positioned within the exterior ends of the channels, the interior ends of the channels of one of the identical housings being positioned adjacent to the interior ends of the channels of the other identical housing, each of the plurality of supply and receiving line fittings being sized for insertion through the interior ends of the channels to couple with at least one of the supply and pneumatic receiving lines, the over-center latch being configured to couple the cantilevered portions of the ribs of one of the identical housings to the cantilevered portions of the ribs of the other identical housing to separably couple the two-piece housing together.

2. A pneumatic coupling configured to couple a plurality of pneumatic lines, the pneumatic coupling comprising
a first housing having at least one aperture sized to receive a first pneumatic line of the plurality of the pneumatic lines,
a second housing having at least one aperture sized to receive a second pneumatic line of the plurality of pneumatic lines, and
a coupler configured to couple the second housing to the first housing to couple the first and second pneumatic lines in fluid communication, the coupler including a link pivotably coupled to the first housing and a latch member coupled to the link to pivot about a pivot axis extending through the link, the latch member being configured to couple the second housing to the first housing, wherein the first housing includes a plurality of apertures sized to receive a plurality of pneumatic lines and the second housing includes a plurality of apertures sized to receive a plurality of pneumatic lines.

3. The pneumatic coupling of claim 2, further comprising another coupler configured to couple the first housing to the second housing to couple the first and second pneumatic lines in fluid communication and including a link pivotably coupled to the second housing and a latch member pivotably coupled to said link and configured to couple to the first housing to couple the first housing to the second housing.

4. The pneumatic coupling of claim 2, wherein the latch member is movable between an unlatched position and to an over-center position where it is urged to a latched position.

5. The pneumatic coupling of claim 2, wherein the latch member is movable between first, second, and third positions, the first and second housings are coupled together and the first and second pneumatic lines are in fluid communication when the latch member is in the first position, the first and second housings are spaced apart and the first and second pneumatic lines are unsealed when the latch member is in the second position, the latch member restrains movement of the second housing relative to the first housing when in the second position, the latch member is spaced apart from the second housing when in the third position to permit unrestrained movement of the second housing relative to the first housing.

6. A pneumatic coupling configured to couple a plurality of pneumatic lines, the pneumatic coupling comprising a first housing adapted to receive a first pneumatic line of the plurality of pneumatic lines, and a second housing adapted to receive a second pneumatic line of the plurality of pneumatic lines, the second housing being movable relative to the first housing between a first position coupled to the first housing and a second position coupled to the first housing, when the second housing is in the first position, the first and second pneumatic lines are in sealed fluid communication permitting air to flow therebetween, when the second housing is in the second position, the first and second pneumatic lines are unsealed permitting air from the first pneumatic line to flow externally of the first and second pneumatic lines, wherein the first housing is adapted to receive a plurality of pneumatic lines including the first pneumatic line, the second housing is adapted to receive a plurality of pneumatic lines including the second pneumatic line, the plurality of pneumatic lines received by the first housing are in sealed fluid communication with the plurality of pneumatic lines received by the second housing when the second housing is in the first position.

7. The pneumatic coupling of claim 6, wherein the second housing is movable to a third position uncoupled from the first housing and unrestrained relative to the first housing.

8. The pneumatic coupling of claim 7, further comprising a plurality of fittings configured to receive the pneumatic lines received by the first and second housings.

9. A pneumatic device comprising a first pneumatic component configured to receive pressurized air, a second pneumatic component configured to receive pressurized air, and a pneumatic coupling configured to couple the first pneumatic component to the second pneumatic component, the pneumatic coupling being configured to move from a first position with the first and second components fluidly coupled to permit the flow of pressurized air from the first pneumatic component to the second pneumatic component and a second position with the first and second pneumatic components fluidly uncoupled to permit the flow of pressurized air from the first pneumatic component to a location external of the first and second pneumatic components, the second pneumatic component being restrained from moving beyond a predetermined distance from the first pneumatic component when the pneumatic coupling is in the second position, wherein the pneumatic coupling includes first and second housings and a coupler configured to couple the first and second housings together, and a first plurality of pneumatic lines and a second plurality of fluid lines, the first pneumatic component is a pneumatic line included in the first plurality of pneumatic lines, the second pneumatic component is a pneumatic line included in the second plurality of pneumatic lines, the first housing is configured to receive the first plurality of fluid lines, the second housing is configured to receive the second plurality of fluid lines, the first and second plurality of pneumatic lines being in sealed fluid communication when the pneumatic coupling is in the first position.

10. The pneumatic device of claim 9, wherein the first and second plurality of pneumatic lines are simultaneously sealed together when the pneumatic coupling moves to the first position and simultaneously unsealed when the pneumatic coupling moves to the second position.

11. A pneumatic coupling configured to couple a plurality of pneumatic lines, the pneumatic coupling comprising a housing adapted to receive the plurality of pneumatic lines, the housing including an interior region and exterior edges defining a plurality of apertures sized to receive the plurality of pneumatic lines, the plurality of edges defining a minimum width across the plurality of apertures, and a plurality of fittings sized to receive the plurality of pneumatic lines, at least a portion of the plurality of fittings being positioned in the interior region of the housing in a position aligned with a corresponding one of the plurality of apertures, the portions of the plurality of fittings having a maximum width that is greater than the minimum width of the corresponding aperture of the housing, the housing including a plurality of fitting-receiving channels positioned adjacent to the plurality of exterior edges defining the plurality of apertures, each fitting including a plug member positioned in one of the fitting-receiving channels, a seal positioned between the plug member and one of the plurality of pneumatic lines extending through one of the plurality of apertures of the housing, a pneumatic line clamp positioned between said pneumatic line and the fitting-receiving channel, a tube support positioned in an end of said pneumatic line, a clamp actuator extending through said aperture and positioned to engage the pneumatic line clamp, and an O-ring positioned to seal with a plug member of an oppositely positioned fitting.

12. A pneumatic coupling configured to couple a plurality of pneumatic lines, the pneumatic coupling comprising a housing adapted to receive the plurality of pneumatic lines, the housing including an interior region and exterior edges defining a plurality of apertures sized to receive the plurality of pneumatic lines, the plurality of edges defining a minimum width across the plurality of apertures, and a plurality of fittings sized to receive the plurality of pneumatic lines, at least a portion of the plurality of fittings being positioned in the interior region of the housing in a position aligned with a corresponding one of the plurality of apertures, the portions of the plurality of fittings having a maximum width that is greater than the minimum width of the corresponding aperture of the housing, the housing including a first housing and a second housing separable from the first housing, the first and second housings including a plurality of channels sized to receive the plurality of fittings, the plurality of fittings including a plurality of first fittings positioned in the channels of the first housing and adapted to seal with a plurality of pneumatic lines extending into the first housing, and the plurality of fittings including a plurality of second fittings positioned for sealed contact with the plurality of first fittings and adapted to seal with a plurality of pneumatic lines extending into the second housing.

13. A pneumatic coupling configured to couple a plurality of pneumatic components, the pneumatic coupling comprising a housing configured to receive a plurality of pneumatic components and fluidly couple first and second pneumatic components of the plurality of pneumatic components together, the housing including a housing body and a plurality of parallel ribs extending substantially across the housing body to strengthen the housing, the plurality of parallel ribs defining a plurality of grooves therebetween, at least one of the plurality of parallel ribs including a notch, to receive a coupler.

14. The pneumatic coupling of claim 13, wherein the housing body includes a plurality of channel bodies coupled to the plurality of ribs, the channel bodies cooperate to define a plurality of channels sized to receive the first and second pneumatic components.

15. The pneumatic coupling of claim 14, further comprising a plurality of pneumatic line fittings, wherein the plurality of pneumatic line fittings are positioned in the channel bodies and cooperate to provide fluid communication between the first and second pneumatic components.

16. The pneumatic coupling of claim 15, wherein the channel bodies and the ribs cooperate to define a plurality of apertures in the housing.

17. The pneumatic coupling of claim 16, wherein the housing includes identical half portions that are separable from one another.

18. The pneumatic coupling of claim 17, wherein each identical half portion includes a plurality of rib portions extending away from the channel bodies, the pneumatic coupling further comprising a coupler configured to couple the plurality of rib portions of each half portion of the housing together to couple the identical half portions of the housing together.

19. A method of coupling and uncoupling first and second pneumatic components using a pneumatic coupling, the method comprising the steps of coupling the first pneumatic component to the second pneumatic component using the pneumatic coupling so that the first and second pneumatic components are in sealed fluid communication and providing fluid communication between a plurality of pneumatic supply lines and a plurality of pneumatic receiving lines, unsealing the first pneumatic component from the second pneumatic component by permitting movement of the second pneumatic component relative to the first pneumatic component, restraining movement of the second pneumatic component beyond a predetermined location relative to the first pneumatic component with the pneumatic coupling after the unsealing step, and uncoupling the first pneumatic component from the second pneumatic component so that the movement of the second pneumatic component is no longer restrained by the pneumatic coupling.

20. The method of claim 19, wherein the coupling, unsealing, and restraining steps are provided by an over-center latch.

21. The method of claim 19, wherein the unsealing step releases pressure in the pneumatic supply and receiving lines.

22. A method of assembling a pneumatic device comprising the steps of providing a pneumatic coupling including a housing and a fitting, the housing defining an interior region, an interior aperture, and an exterior aperture spaced apart from the interior aperture, the pneumatic coupling including a plurality of fittings and the housing including a plurality of interior apertures and a plurality of exterior apertures, each of the plurality of fittings being associated with one of the plurality of interior apertures and one of the plurality of exterior apertures, the plurality of interior apertures being spaced apart from the associated plurality of exterior apertures, and inserting the fitting through the interior aperture into the interior region of the housing to a position aligned with the exterior aperture and inserting each of the plurality of fittings through its associated interior aperture into the interior region of the housing to a position aligned with its associated exterior aperture.

23. The method of claim 22, wherein the inserting step includes positioning a first portion of the fitting adjacent to the exterior aperture and inserting a second portion of the fitting through the exterior aperture to couple with the first portion of the fitting.

24. The method of claim 23, wherein a portion of the housing is sandwiched between the first and second portions of the fitting.

25. The method of claim 22, wherein the housing includes a plurality of exterior apertures and a plurality of fitting-receiving channels having a first ends positioned adjacent to the exterior apertures and a second ends spaced apart from the first ends, the providing step further includes providing a plurality of fittings, the inserting step further includes positioning at least first portions of the plurality of fittings in the plurality of fitting-receiving channels through the second ends.

26. The method of claim 22, further comprising a step of inserting a pneumatic line through the exterior aperture.

27. The method of claim 26, wherein the pneumatic coupling defines a flow path, the fitting is inserted through the interior aperture in a first direction along the flow path during the fitting insertion step, the pneumatic line is inserted in a second direction along the flow path during the pneumatic line insertion step, the second direction is opposite the first direction.

28. The method of claim 22, wherein at least a portion of the fitting is inserted into the interior region of the housing without passing through the exterior aperture.

29. The method of claim 22, wherein a plurality of the pneumatic fittings are co-axial after the fitting insertion step.

30. A pneumatic coupling configured to couple a plurality of pneumatic lines, the pneumatic coupling comprising a housing adapted to receive the plurality of pneumatic lines, the housing including a housing body defining an interior region and a plurality of lips having edges defining a plurality of apertures sized to receive the plurality of pneumatic lines, the plurality of edges defining a minimum width across the plurality of apertures, the plurality of lips being integral with the housing body, and a plurality of fittings sized to receive the plurality of pneumatic lines, at least a portion of the plurality of fittings being positioned in the interior region of the housing in a position aligned with a corresponding one of the plurality of apertures, the portions of the plurality of fittings having a maximum width that is greater than the minimum width of the corresponding aperture of the housing, wherein the plurality of fittings include a tube chuck configured to grasp the pneumatic lines, the tube chuck having a diameter greater than the minimum width across the plurality of apertures.

31. A method of assembling a pneumatic device comprising the steps of providing a pneumatic coupling including a housing and a fitting, the housing defining an interior region, an interior aperture, and an exterior aperture spaced apart from the interior aperture, the fitting includes a tube chuck configured to grasp a pneumatic line and a chuck release configured to permit release of the pneumatic line from the tube chuck, inserting the fitting through the interior aperture into the interior region of the housing to a position aligned with the exterior aperture, wherein the tube chuck is moved in a first direction into the interior region of the housing, and inserting at least a portion of the chuck release into the interior region of the housing in a second direction opposite the first direction.

32. The method of claim 31, wherein the tube chuck fails to pass through the exterior aperture during the fitting insertion step.

33. A pneumatic coupling configured to couple a plurality of pneumatic components, the pneumatic coupling comprising a housing configured to receive a plurality of pneumatic components and fluidly couple first and second pneumatic components of the plurality of pneumatic components together, the housing including a housing body and a plurality of parallel ribs extending substantially across the housing body to strengthen the housing, the plurality of parallel ribs defining a plurality of grooves therebetween, the housing body includes a plurality of channel bodies coupled to the plurality of ribs, the channel bodies cooperate to define a plurality of channels sized to receive the first and second pneumatic components, and a plurality of pneumatic line fittings, wherein the plurality of pneumatic line fittings are positioned in the channel bodies and cooperate to provide fluid communication between the first and second pneumatic components.

34. The pneumatic coupling of claim 33 wherein the channel bodies and ribs cooperate to define a plurality of apertures in the housing.

35. The pneumatic coupling of claim 34, wherein the housing includes identical half portions that are separable from one another.

36. The pneumatic coupling of claim 35, wherein each identical half portion includes a plurality of rib portions extending away from the channel bodies, the pneumatic coupling further comprising a coupler configured to couple the plurality of rib portions of each half portion of the housing together to couple the identical half portions of the housing together.

* * * * *